US012308567B2

(12) United States Patent
Soh et al.

(10) Patent No.: US 12,308,567 B2
(45) Date of Patent: May 20, 2025

(54) RECEPTACLE MODULE AND CONNECTOR ASSEMBLY

(71) Applicant: Molex, LLC, Lisle, IL (US)

(72) Inventors: Eng-Kan Soh, Jurong Town (SG); Daniel B. McGowan, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 66 days.

(21) Appl. No.: 18/369,211

(22) Filed: Sep. 18, 2023

(65) Prior Publication Data

US 2024/0006809 A1 Jan. 4, 2024

Related U.S. Application Data

(63) Continuation of application No. 17/407,215, filed on Aug. 20, 2021, now Pat. No. 11,799,239.

(60) Provisional application No. 63/073,949, filed on Sep. 3, 2020.

(51) Int. Cl.

| | |
|---|---|
| ***H01R 13/627*** | (2006.01) |
| ***H01R 13/631*** | (2006.01) |
| ***H01R 13/635*** | (2006.01) |

(52) U.S. Cl.

CPC ....... *H01R 13/6275* (2013.01); *H01R 13/631* (2013.01); *H01R 13/635* (2013.01)

(58) Field of Classification Search

None

See application file for complete search history.

(56) References Cited

U.S. PATENT DOCUMENTS

| | | | | |
|---|---|---|---|---|
| 7,090,523 | B2 | 8/2006 | Shirk et al. | |
| 7,156,683 | B2 | 1/2007 | Gupta et al. | |
| 8,465,311 | B2 | 6/2013 | Takamatsu | |
| 12,176,650 | B2 * | 12/2024 | Lu ...................... | H01R 12/7005 |
| 2006/0084313 | A1 | 4/2006 | Gupta et al. | |
| 2011/0103752 | A1 | 5/2011 | Little et al. | |

(Continued)

FOREIGN PATENT DOCUMENTS

| | | | |
|---|---|---|---|
| CN | 1372357 | A | 10/2002 |
| CN | 2715387 | Y | 8/2005 |

(Continued)

OTHER PUBLICATIONS

Final office action received for U.S. Appl. No. 17/407,215 mailed on Mar. 27, 2023, 11 pages.

(Continued)

*Primary Examiner* — Oscar C Jimenez

(57) ABSTRACT

A connector assembly is provided. The connector assembly includes a receptacle module and a pluggable module. The receptacle module includes a cage, a receptacle connector, a biasing spring, and a locking member. The pluggable module is moved from a front end to a back end, so as to be aligned and mated with the receptacle module. The biasing spring is configured to apply a spring load toward the front end of the cage. Accordingly, the mating between the receptacle module and the pluggable module may be accomplished through alignment in the following manner: the pluggable module pushes the receptacle connector toward the back end to compress the biasing spring, so that the receptacle connector is moved toward the back end to the locking member to be mated with the pluggable module.

20 Claims, 21 Drawing Sheets

(56) References Cited

U.S. PATENT DOCUMENTS

| | | | | |
|---|---|---|---|---|
| 2013/0034992 | A1 | 2/2013 | Phillips et al. | |
| 2013/0094811 | A1 | 4/2013 | Rossman | |
| 2013/0109225 | A1 | 5/2013 | Liu | |
| 2014/0004728 | A1* | 1/2014 | Zhou | H01R 13/60 439/131 |
| 2014/0024244 | A1* | 1/2014 | Fogg | H01R 13/6587 439/352 |
| 2015/0125118 | A1 | 5/2015 | Droesbeke | |
| 2019/0123481 | A1 | 4/2019 | Oishi et al. | |
| 2020/0280145 | A1 | 9/2020 | Zbinden et al. | |

FOREIGN PATENT DOCUMENTS

| | | | |
|---|---|---|---|
| CN | 2770145 | Y | 4/2006 |
| CN | 201601248 | U | 10/2010 |
| CN | 201927746 | U | 8/2011 |
| CN | 102176593 | A | 9/2011 |
| CN | 202817373 | U | 3/2013 |
| CN | 104823093 | A | 8/2015 |
| CN | 205282829 | U | 6/2016 |
| CN | 105814745 | A | 7/2016 |
| CN | 208078309 | U | 11/2018 |
| CN | 208284739 | U | 12/2018 |
| CN | 209401878 | U | 9/2019 |
| CN | 111326918 | A | 6/2020 |
| CN | 210779276 | U | 6/2020 |
| JP | 2002008780 | A | 1/2002 |
| JP | 2004186136 | A | 7/2004 |
| JP | 2006147419 | A | 6/2006 |
| TW | I523338 | B | 2/2016 |
| TW | M600020 | U | 8/2020 |

OTHER PUBLICATIONS

Non-Final office action received for U.S. Appl. No. 17/407,215 mailed on Oct. 24, 2022, 10 pages.

* cited by examiner

RECEPTACLE MODULE AND CONNECTOR ASSEMBLY

RELATED APPLICATIONS

This application is a continuation of U.S. patent application Ser. No. 17/407,215, filed Aug. 20, 2021, which claims priority to U.S. Provisional Application No. 63/073,949 filed on Sep. 3, 2020, the contents of each being hereby incorporated by reference in their entireties.

FIELD OF THE INVENTION

Embodiments of the present disclosure relate to a receptacle module and a connector assembly, and in particular, to a receptacle module and a connector assembly having a biasing spring that applies a force to the receptacle module and a pluggable module mated with each other so that the alignment and the mating between the receptacle module and the pluggable module can be stable.

BACKGROUND ART

U.S. Pat. No. 7,090,523 discloses a release mechanism of a transceiver module assembly. A module element thereof includes a circuit board exposed from a back end. An edge of the circuit board may be inserted into a receptacle connector in a receptacle element. The circuit board is inserted into a slot of the receptacle connector to be in contact with a conductive terminal. No mutual force is required between the module element and the receptacle connector. However, this plug-in method is not suitable for terminal contact structures in other forms. In addition, one of guiding frames (also referred to as a cage frame) requires a protruding stopper to prevent module element from entering excessively deep after passing through the guiding frame.

In other words, the module element disclosed in the US patent is actually inserted through the guiding frame to be mated with the receptacle connector. However, a large gap between the module element and the guiding frame usually results in a failure of alignment between the module element and the receptacle element.

In addition, the module element disclosed in the US patent is usually stuck during unlocking. This is because a latch element thereof is formed by rectangular protrusions obtained through stamping of side walls and has a structure inserted obliquely inward that is likely to be stuck by an actuator arm of an ejector mechanism.

The foregoing description of the prior art merely provides a background, does not acknowledge that the foregoing description of the "prior art" reveals the objective of the present disclosure, does not constitute the prior art of the present disclosure, and any description of the "prior art" should not be used as any part of this specification.

SUMMARY

Embodiments of the present disclosure provide a receptacle module. The receptacle module includes a cage, a receptacle connector, a biasing spring, and a locking member. The cage has at least one accommodation space formed by a plurality of wall plates. The accommodation space has a front end and a back end opposite to the front end. The accommodation space includes an insertion space close to the front end and an assembling space close to the back end. The receptacle connector is disposed in the assembling space. The receptacle connector is movable from an initial position toward the back end. The receptacle connector includes a first mating end. The first mating end faces an insertion end of the cage. The first mating end has a receptacle terminal portion and a receptacle alignment portion. The receptacle terminal portion has a plurality of receptacle terminals. The biasing spring is disposed between the receptacle connector and the back end and is configured to apply a spring load to the receptacle connector toward the front end. The locking member is disposed on a side wall of the cage in the insertion space and extends from the side wall into the insertion space.

In some embodiments, the receptacle terminal portion and the receptacle alignment portion are respectively disposed in separate and independent regions of the first mating end.

In some embodiments, the receptacle terminals include a plurality of first contact portions suspended on the receptacle terminal portion without being supported.

In some embodiments, the receptacle alignment portion includes a plurality of first alignment protruded portions, a plurality of second alignment protruded portions, and at least one alignment recessed portion. A length by which the first alignment protruded portions protrude is greater than a length by which the second alignment protruded portions protrude. The at least one first alignment recessed portion is located between the second alignment protruded portions.

In some embodiments, the first alignment protruded portions are located on two sides of the first alignment recessed portions.

In some embodiments, the locking member includes a locking elastic sheet. The locking elastic sheet includes a fixing portion, an elastic arm, a locking portion, and a guiding section. The fixing portion is assembled on the side wall. The elastic arm is connected to the fixing portion and extends into the insertion space and toward the front end. The locking portion is connected to the elastic arm and further extends into the insertion space. The guiding section is connected to the locking portion and extends toward the side wall and the front end to form, with the locking portion, a protruded portion folded into the insertion space.

In some embodiments, the locking elastic sheet further includes a limiting edge. The limiting edge is connected to the guiding section and is located at a tail end of the locking elastic sheet. The cage further includes an opening disposed on the side wall of the insertion space and a limiting block disposed on a side of the opening facing the front end. When the locking elastic sheet is subjected to no force, the limiting edge abuts against the limiting block, and when the locking elastic sheet is subjected to a force, the limiting edge is moved out of the opening.

In some embodiments, the receptacle module further includes at least one back plate disposed at the back end of the cage, the biasing spring being disposed between the receptacle connector and the back plate.

In some embodiments, the receptacle connector further includes a receptacle housing, the receptacle terminals being disposed at a front end of the receptacle housing, and the receptacle terminals being electrically connected to a plurality of first wires, the first wires extending from a side surface of the receptacle housing toward the back end and passing through an outlet opening of the back plate.

In some embodiments, the receptacle module further includes a limiting slot and an alignment protruding bar. The limiting slot is provided on the wall plate. The alignment protruding bar is disposed on a side surface of the receptacle connector adjacent to the wall plate on which the limiting slot is provided. When the receptacle connector is at an initial position, the alignment protruding bar abuts against a side edge of the limiting slot subjected to a force applied by the biasing spring, and when the receptacle connector is in a use state, the alignment protruding bar is moved toward the back end along the limiting slot.

Embodiments of the present disclosure provide a connector assembly. The connector assembly includes a receptacle module and a pluggable module. The receptacle module includes a cage, a receptacle connector, a biasing spring, and a locking member. The cage has at least one accommodation space formed by a plurality of wall plates. The accommodation space has a front end and a back end opposite to the front end. The accommodation space includes an insertion space close to the front end and an assembling space close to the back end. The receptacle connector is disposed in the assembling space. The receptacle connector is movable from an initial position toward the back end. The receptacle connector includes a first mating end. The first mating end faces an insertion end of the cage. The first mating end has a receptacle terminal portion and a receptacle alignment portion. The receptacle terminal portion has a plurality of receptacle terminals. The biasing spring is disposed between the receptacle connector and the back end and is configured to apply a spring load to the receptacle connector toward the front end. The locking member is disposed on a side wall of the cage in the insertion space and extends from the side wall into the insertion space. The pluggable module is allowed to be inserted into the accommodation space and is moved from the front end to the back end to be inserted into the receptacle module. The pluggable module includes a housing and a plug connector. The housing has a locking fitting portion at one side. The plug connector is disposed in the housing and has a second mating end, the second mating end having a plug terminal portion and a plug alignment portion. The plug terminal portion has a plurality of plug terminals. The pluggable module is moved from the front end to the back end to enter the receptacle module under first guidance in the insertion space of the accommodation space, and is inserted into the receptacle module under second guidance of the plug alignment portion complementary to the receptacle alignment portion. When the pluggable module is inserted into the receptacle module, the locking fitting portion is locked by the locking member so that the pluggable module does not detach from the receptacle module, the receptacle connector is moved from the initial position toward the back end to an mating position, and the receptacle terminals of the receptacle terminal portion are in contact with the plug terminals of the plug terminal portion.

In some embodiments, the receptacle terminal portion and the receptacle alignment portion are respectively disposed in separate and independent regions of the first mating end, and the plug terminal portion and the plug alignment portion are respectively disposed in separate and independent regions of the second mating end.

In some embodiments, the receptacle terminals include a plurality of first contact portions suspended on the receptacle terminal portion without being supported, and the plug terminals include a plurality of second contact portions suspended on the plug terminal portion without being supported, the second contact portions being in contact with the first contact portions when the pluggable module is mated with the receptacle module.

In some embodiments, at least one first alignment structure and at least one second alignment structure exist between the receptacle alignment portion and the plug alignment portion. The first alignment structure and the second alignment structure are configured to have a former stage and a latter stage of alignment and fitting, and a fit tolerance between the first alignment structures is greater than a fit tolerance between the second alignment structures.

In some embodiments, the first alignment structure includes a plurality of first alignment protruded portions disposed on the receptacle alignment portion and a plurality of third alignment recessed portions disposed on the plug alignment portion, the first alignment protruded portions and the third alignment recessed portions being aligned with and fitting each other. The second alignment structure includes a first alignment recessed portion disposed between a plurality of second alignment protruded portions of the receptacle alignment portion and a plurality of third alignment protruded portions disposed on the plug alignment portion, the third alignment protruded portions and the first alignment recessed portion being aligned with and fitting each other.

In some embodiments, a length by which the first alignment protruded portions protrude is greater than a length by which the second alignment protruded portions protrude.

In some embodiments, the first alignment protruded portions are located on two sides of the second alignment protruded portions.

In some embodiments, the locking member of the receptacle module includes a locking elastic sheet. The locking elastic sheet includes a fixing portion, an elastic arm, a locking portion, and a guiding section. The fixing portion is assembled on the side wall. The elastic arm is connected to the fixing portion and extends into the insertion space and toward the front end. The locking portion is connected to the elastic arm and further extends into the insertion space. The guiding section is connected to the locking portion and extends toward the side wall and the front end to form, with the locking portion, a protruded portion folded into the insertion space. The locking fitting portion of the pluggable module includes a locking recessed portion. When the pluggable module is inserted into the receptacle module, the locking portion of the locking elastic sheet abuts against an inner edge of the locking recessed portion facing the back end.

In some embodiments, the locking elastic sheet further includes a limiting edge connected to the guiding section and located at a tail end of the locking elastic sheet, and the cage further includes an opening disposed on the side wall of the insertion space and a limiting block disposed on a side of the opening facing the front end. When the locking elastic sheet is subjected to no force, the limiting edge abuts against the limiting block, and when the locking elastic sheet is subjected to a force, the limiting edge is moved out of the opening.

In some embodiments, the pluggable module further includes an unlocking member subjected to a spring load, the unlocking member including two side arms disposed on two sides of the pluggable module, an inclined unlocking surface being disposed on one end of each of the side arms respectively, and the inclined unlocking surface being configured to push away the locking elastic sheet when the unlocking member is moved toward the front end, so that the locking portion exits the locking recessed portion.

In some embodiments, the receptacle module further includes at least one back plate disposed at the back end of the cage, the biasing spring being disposed between the receptacle connector and the back plate. The receptacle connector further includes a receptacle housing, the receptacle terminals being disposed at a front end of the receptacle housing, and the receptacle terminals being electrically connected to a plurality of first wires, the first wires extending from a side surface of the receptacle housing toward the back end and passing through an outlet opening of the back plate. The plug connector further includes a plug housing configured to accommodate the plug terminals and electrically connect the plug terminals to a plurality of second wires.

In some embodiments, a limiting slot is provided on the wall plate, a side surface of the receptacle connector facing the limiting slot having a corresponding alignment protruding bar for fitting, and the receptacle connector being subjected to a force applied by the biasing spring so that one end of the alignment protruding bar abuts against a front inner end of the limiting slot, so that when not connected to the pluggable module, the receptacle connector is at the initial position. When the pluggable module is inserted into the receptacle module, the alignment protruding bar is moved toward the back end along the limiting slot.

The technical features and advantages of the present disclosure have been quite extensively summarized above, so that the detailed description of the present disclosure below can be better understood. Other technical features and advantages that constitute the scope of the patent application of the present disclosure will be described below. A person of ordinary skill in the art of the present disclosure should understand that the concepts and specific embodiments disclosed below can be used fairly easily to modify or design other structures or processes to achieve the same purpose as the present disclosure. A person of ordinary skill in the art of the present disclosure should also understand that such equivalent constructions cannot deviate from the spirit and scope of the present disclosure as defined by the attached patent scope.

BRIEF DESCRIPTION OF THE DRAWINGS

Referring to the detailed description and drawings with reference to the claims, a more complete understanding of the present disclosure may be obtained by reference to the detailed description taken in conjunction with the claims. The same element symbols in the drawings refer to the same elements.

DETAILED DESCRIPTION

Figure 1:
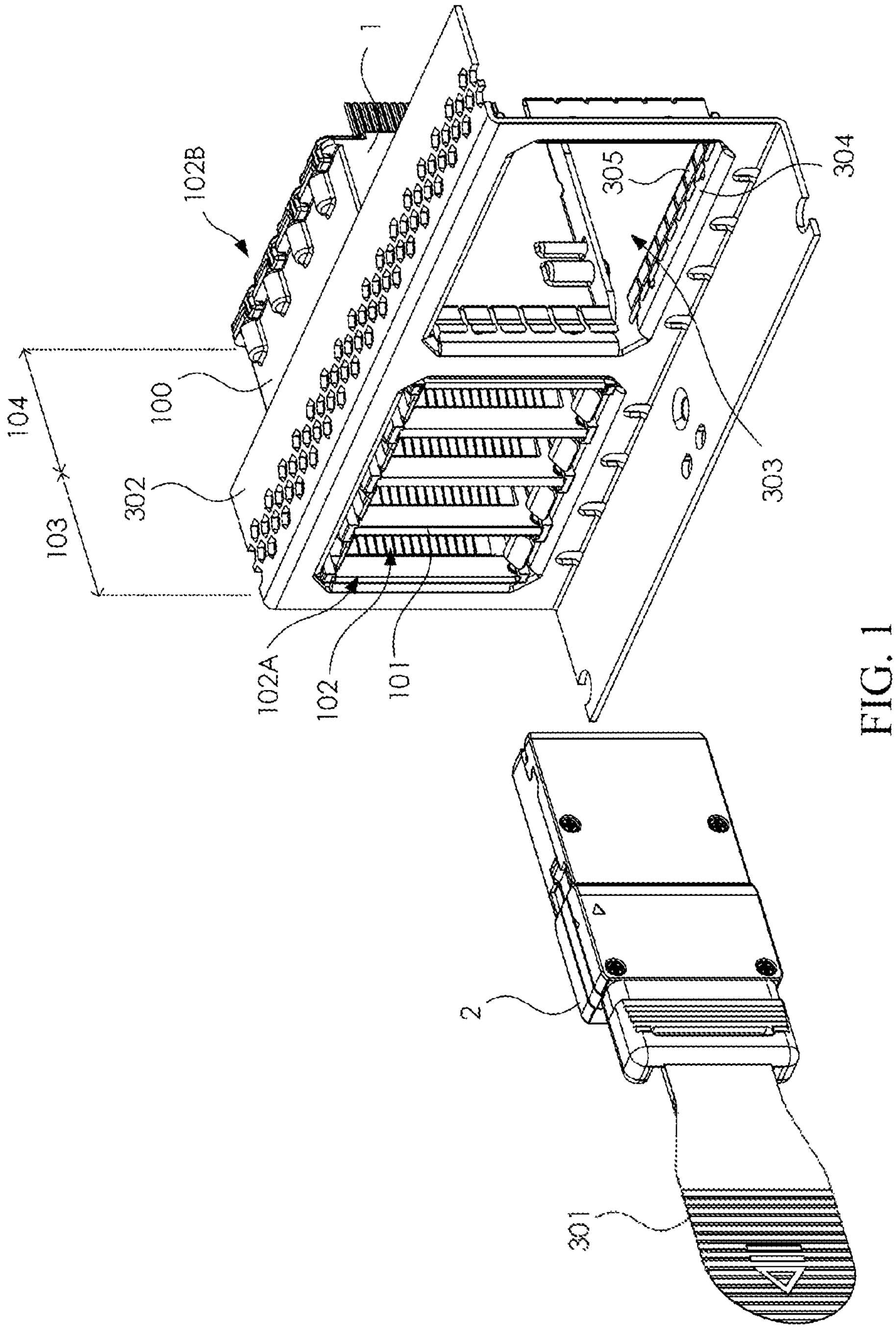
FIG. 1 is a perspective view of an embodiment of a receptacle module and a pluggable module.

The embodiments or examples of the content of the present disclosure shown in the drawings are described in specific language. It should be understood that this is not intended to limit the scope of the present disclosure. Any changes or modifications of the embodiments and any further application of the principles described in this specification can normally occur to a person of ordinary skill in the relevant art of the present disclosure. The element symbols may be repeated in each embodiment, but even if they have the same element symbols, the features in an embodiment are not necessarily used in another embodiment.

It should be understood that although terms such as first, second, and third in this specification may be used for describing various elements, components, areas, layers, and/or parts, the elements, components, areas, layers, and/or parts are not limited by such terms. The terms are only used to distinguish one element, component, area, layer, or part from another element, component, area, layer, or part. Therefore, the first element, component, area, layer, or part described below may also be referred to as a second element, component, area, layer, or part without departing from the teachings of the present disclosure.

The terms used by the present disclosure are merely used for describing particular embodiments rather than limiting the concept of the present disclosure. As used in this specification, the articles "a", "an", and "the" are intended to include plural forms, unless the context clearly indicates otherwise. It should also be understood that as used in this specification, the term "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a perspective view schematic diagram of a receptacle module 1 and a pluggable module 2 according to the present disclosure. As shown in the figure, the receptacle module 1 includes a cage 100. The cage may be formed through die casting and serve as a casing for shielding internal elements. The cage 100 has at least one accommodation space 102 formed by a plurality of wall plates 101 inside. The accommodation spaces 102 penetrate the cage 100 from front to back to have a front end and a back end opposite to the front end, and a periphery of the accommodation space is a closed structure formed by the cage 100 or the wall plate 101.

In some embodiments, the front end of each of the accommodation spaces 102 serves as an insertion end 102A, and the back end of each of the accommodation spaces 102 serves as an outlet end 102B. The accommodation space 102 may be further divided into an insertion space 103 close to the insertion end 102A and an assembling space 104 near the outlet end 102B. In some embodiments, the insertion space 103 is used to accommodate the pluggable module 2 inserted through the insertion end 102A. The assembling space 104 is used to accommodate a receptacle connector 107 of the receptacle module 1 (see FIG. 5 below), to implement functions such as fixing the pluggable module 2 and mating and electrically connecting the pluggable module 2 and the receptacle module 1, etc.

In addition, in some embodiments, one end of the pluggable module 2 may be connected to a pull tab 301 that can assist in taking the pluggable module 2 out of the receptacle module 1. In some embodiments, a plurality of receptacle modules 1 may be combined with a casing panel 302. A plurality of panel openings 303 are provided on a surface of the casing panel 302 for respectively fixing the plurality of receptacle modules 1 on the panel openings 303. In some embodiments, a periphery of the panel opening 303 may have at least one infolding sheet 304 that may be configured to mount a plurality of outer EMI shielding gaskets 305. The outer EMI shielding gasket 305 has a plurality of elastic sheets to be in contact with an outer peripheral wall surface of the cage 100 for protecting against electromagnetic interference. The outer EMI shielding gasket may also be referred to as a grounding plate.

Figure 2:
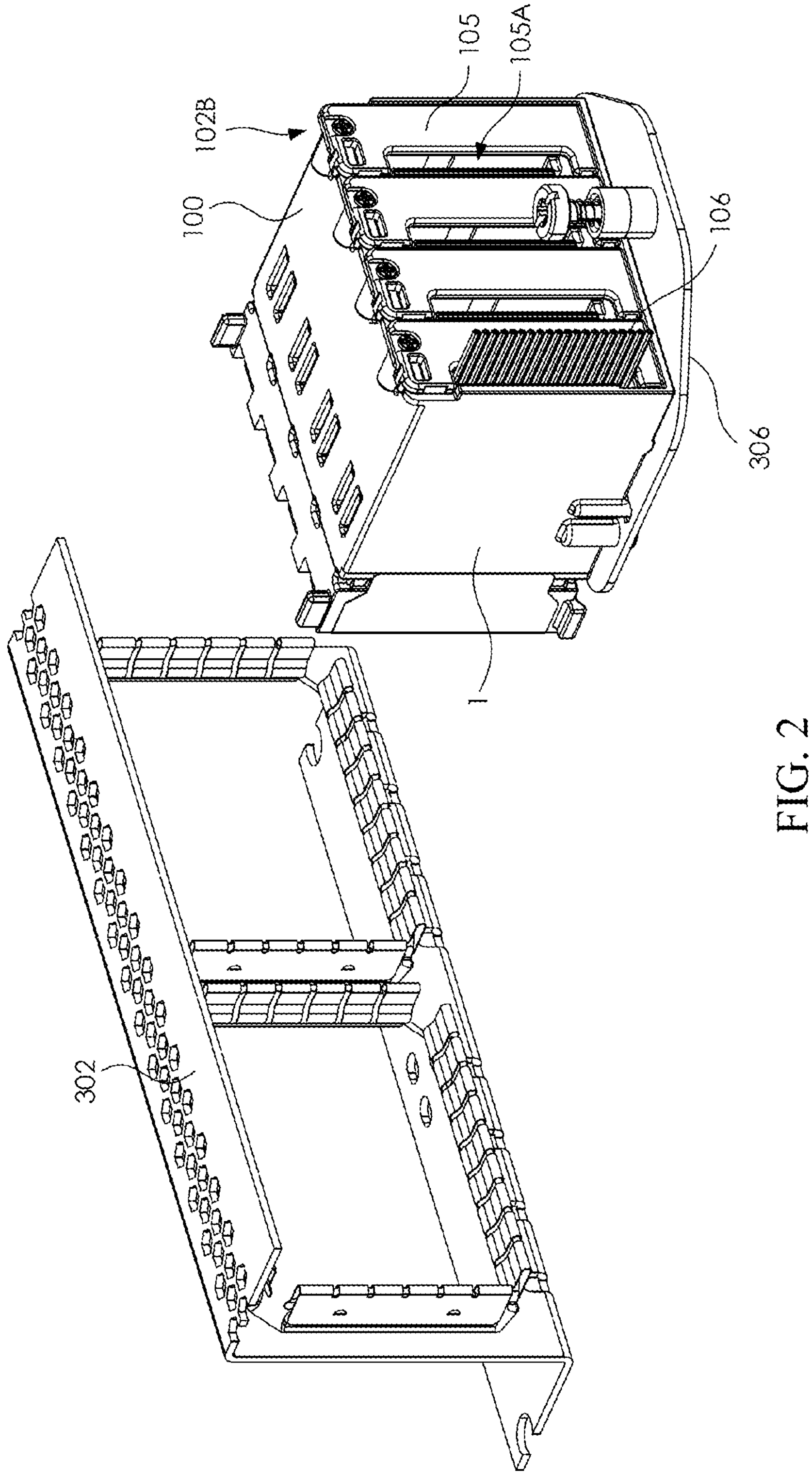
FIG. 2 is a perspective view of an embodiment of a receptacle module.

FIG. 2 is a perspective view schematic diagram of the receptacle module 1 according to the present disclosure, which reveals structures of the casing panel 302 and the receptacle module 1 from another view. As shown in the figure, in some embodiments, a plurality of back plates 105 are provided on the receptacle module 1 at the outlet end 102B of the cage 100. The back plates 105 are configured to shield a back end opening of each of the accommodation spaces 102. In some embodiments, any of the back plates 105 includes at least one outlet opening 105A that is configured to allow a plurality of first wires 106 to exit through the outlet end 102B to be electrically connected to a next transmission node.

Figure 3:
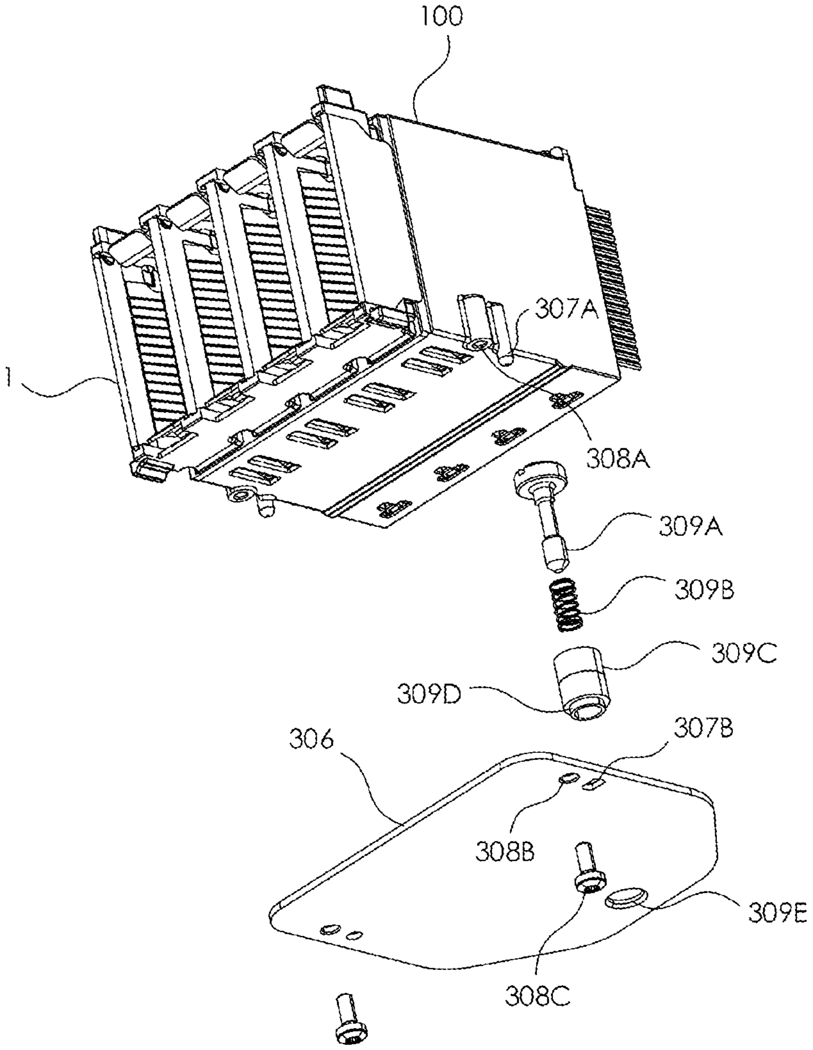
FIG. 3 is a perspective view of an embodiment of a receptacle module.

In some embodiments, the receptacle module 1 may be mounted on a tray 306. The tray 306 can bear and position the receptacle module 1. As shown in a perspective view schematic exploded view of FIG. 3, the receptacle module 1 may include at least one positioning post 307A at a side of the cage 100. The positioning post protrudes from a bottom surface of the cage 100 and may be inserted into a corresponding positioning hole 307B on the tray 306. In some embodiments, the side of the cage 100 may further include an internal threaded hole 308A that allows a screw 308C (external threads are not shown) to pass through a corresponding through hole 308B on the tray 306, so as to lock the tray 306 and the cage 100 through screwing. In some embodiments, the tray 306 may be connected to a workbench (not shown) configured to bear the receptacle module 1. For example, as shown in FIG. 2 and FIG. 3, the tray 306 is fixed on the workbench by using a latching member 309A. A screw of the latching member 309A may have external threads (not shown). After the screw is assembled on a latching member mounting cylinder 309C by passing through a latching member spring 309B, the tray 306 can be locked on the workbench. In some embodiments, one end of the latching member mounting cylinder 309C may include a flange 309D. The flange may be riveted or welded to a corresponding mounting hole 309E on the tray 306 for further fixing.

Figure 4:
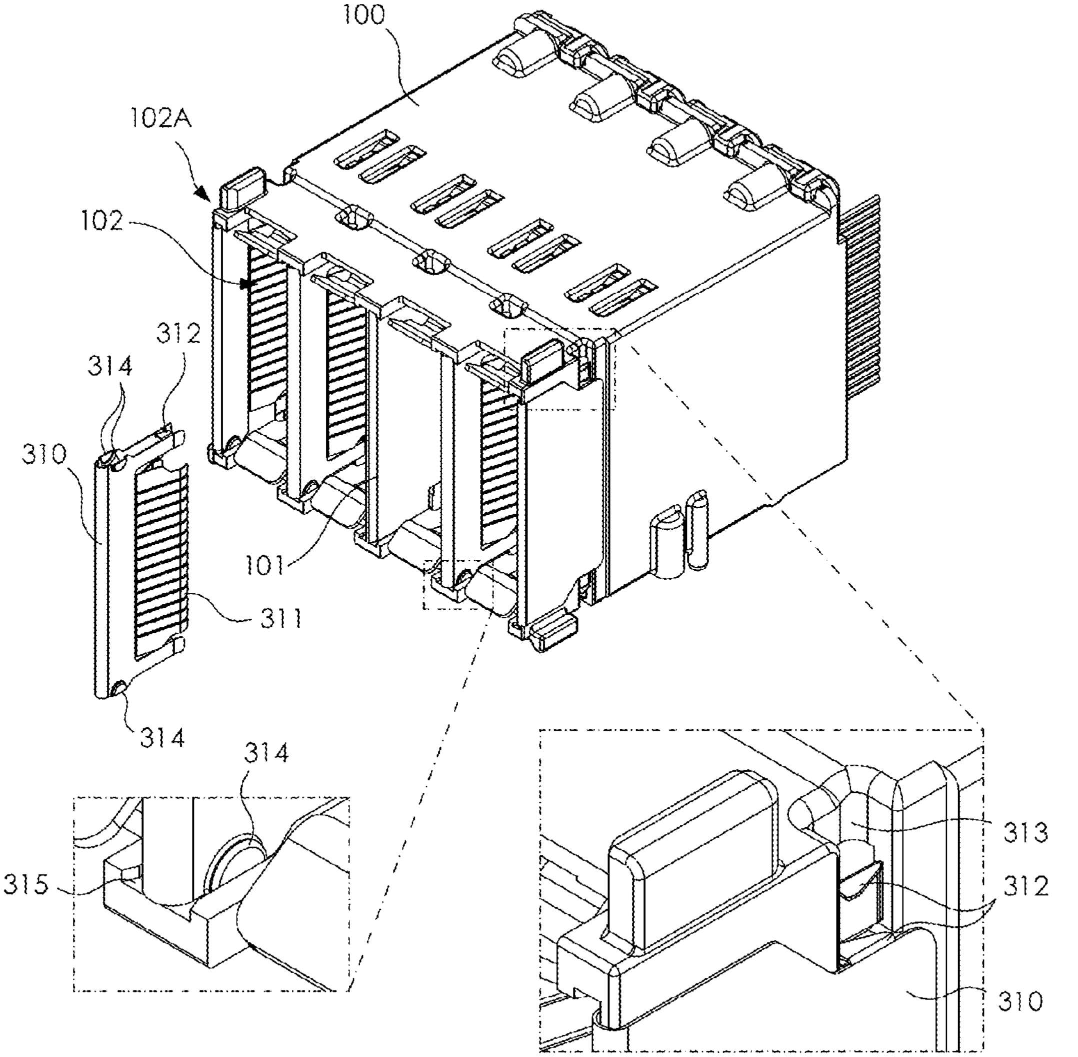
FIG. 4 is a perspective view of an embodiment of a receptacle module.

As shown in FIG. 4, in some embodiments, an inner EMI shielding gasket 310 is disposed in each accommodation space 102 on the wall plate 101 at the insertion end 102A. The inner EMI shielding gasket 310 has a plurality of elastic finger portions 311 extending into the accommodation space 102 to be in contact with the pluggable module 2 inserted into the accommodation space 102. In some embodiments, an upper end and a lower end of the inner EMI shielding gasket 310 both have a holding hook 312. The holding hook may be clamped in a corresponding first trench 313 on the cage 100 or the wall plate 101 so as to be clamped in the cage 100 or the wall plate 101. In some embodiments, the upper end and the lower end of the inner EMI shielding gasket 310 both have a bump structure 314. The bump structure may be clamped in a corresponding second trench 315 on the cage 100 or the wall plate 101 by increasing a width, so as to further strengthen the positioning of the inner EMI shielding gasket 310.

Figure 5:
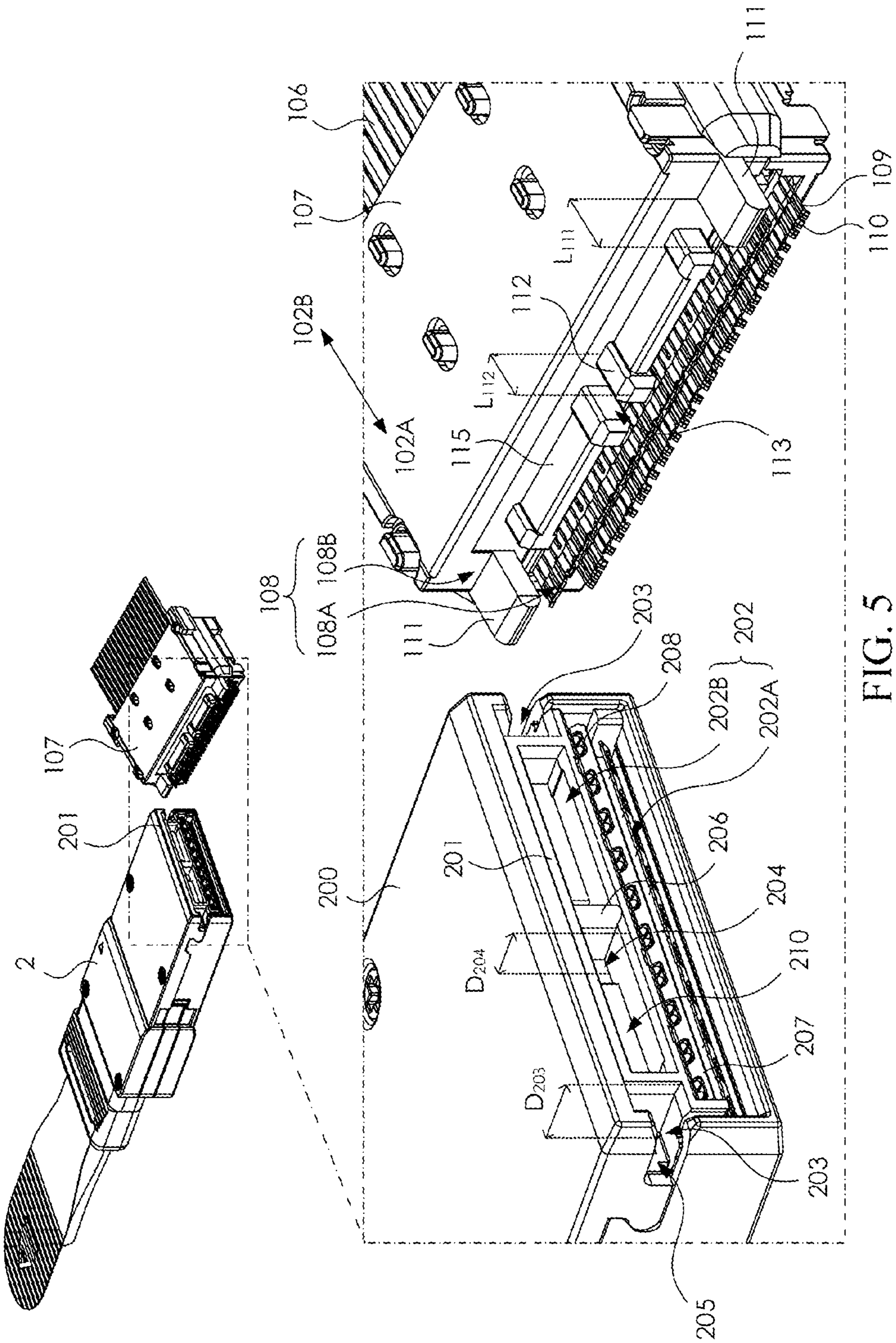
FIG. 5 is a perspective view of an embodiment of a receptacle connector and a plug connector.

FIG. 5 is a perspective view schematic diagram of a plug connector 201 of the pluggable module 2 and a receptacle connector 107 of the receptacle module 1 according to the present disclosure. The receptacle connector 107 is disposed in the assembling space 104 (shown in FIG. 1), and includes a first mating end 108 facing the insertion end 102A. The first mating end 108 has a receptacle terminal portion 108A and a receptacle alignment portion 108B. In some embodiments, the receptacle terminal portion 108A has a plurality of receptacle terminals 109. The receptacle terminal 109 includes a plurality of first contact portions 110. In some embodiments, the first contact portion 110 extends toward the insertion end 102A and is suspended on the receptacle terminal portion 108A without being supported, which is a suspending contact terminal design.

In some embodiments, the receptacle terminal portion 108A for electrical transmission and the receptacle alignment portion 108B to be aligned with and connected to the pluggable module 2 are disposed in different regions of the first mating end 108 facing the insertion end 102A. The two are not alternately arranged or share a structure, and therefore are independent and separate structures. In some embodiments, the receptacle terminal portion 108A and the receptacle alignment portion 108B respectively occupy approximately half of an area of the first mating end 108. For example, as shown in FIG. 5, the receptacle terminal portion 108A is adjacent to a lower side, and the receptacle alignment portion 108B is adjacent to an upper side. The first mating end 108 is equally divided into two substantially same different regions. However, the present disclosure is not limited to the distribution design.

In terms of the pluggable module 2, in some embodiments, the plug connector 201 is disposed in a housing 200 of the pluggable module 2. The plug connector 201 has a second mating end 202. The second mating end 202 has a plug terminal portion 202A and a plug alignment portion 202B. Similar to the above first mating end 108, the plug terminal portion 202A is used for electrical transmission, and the plug alignment portion 202B is to be aligned with and connected to the receptacle alignment portion 108B of the receptacle connector 107. In some embodiments, the plug terminal portion 202A and the plug alignment portion 202B are respectively located in different regions of the second mating end 202. The plug terminal portion 202A and the plug alignment portion 202B are adjacent to each other and are not alternately arranged or share a structure, and therefore are independent and separate structures. In some embodiments, the plug terminal portion 202A and the plug alignment portion 202B respectively occupy approximately half of an area of the second mating end 202. For example, as shown in FIG. 5, the plug terminal portion 202A is adjacent to a lower side, and the plug alignment portion 202B is adjacent to an upper side. The second mating end 202 is equally divided into two substantially same different regions. However, the present disclosure is not limited to the distribution design.

In terms of the receptacle connector 107, in some embodiments, the receptacle alignment portion 108B includes a plurality of first alignment protruded portions 111 and a plurality of second alignment protruded portions 112. With respect to the first mating end 108, a length L111 by which the first alignment protruded portion 111 protrudes is greater than a length L112 by which the second alignment protruded portion 112 protrudes. In terms of the plug connector 201 aligned with and connected to the receptacle connector 107, in some embodiments, the plug alignment portion 202B includes a plurality of third alignment recessed portions 203 and a plurality of fourth alignment recessed portions 204. A depth D203 of the third alignment recessed portion 203 is greater than a depth D204 of the fourth alignment recessed portion 204.

In the alignment and connection relationship between the receptacle connector 107 and the plug connector 201, the third alignment recessed portion 203 is to be mated with and configured to accommodate the first alignment protruded portion 111, and the fourth alignment recessed portion 204 is to be mated with and configured to accommodate the second alignment protruded portion 112. Accordingly, in the present disclosure, positioning structures of different lengths of the receptacle alignment portion 108B may be used, so that during alignment of the plug connector 201 of the pluggable module 2 with the receptacle connector 107 of the receptacle module 1, guiding effects at different stages are generated, facilitating correct connection of the plug connector and the receptacle connector.

In terms of the guiding effects at different stages, restriction of a peripheral wall surface of the insertion space 103 of the accommodation space 102 is first guidance for an insertion process. During mating between the pluggable module 2 and the receptacle connector 107 shown in FIG. 5, alignment and fitting between the plug alignment portion 202B and the receptacle alignment portion 108B is second guidance for the insertion process.

In some embodiments, at least one first alignment structure and at least one second alignment structure exist between the receptacle alignment portion 108B and the plug alignment portion 202B. The first alignment structure and the second alignment structure are configured to have a former stage and a latter stage of alignment and fitting, to implement mating designs of the second guidance at different stages. The first alignment protruded portion 111 disposed on the receptacle alignment portion 108B and the third alignment recessed portion 203 disposed on the plug alignment portion 202B belong to the first alignment structure, that is, the first alignment protruded portion 111 and the third alignment recessed portion 203 are aligned with and fit each other.

Specifically, during the second guidance, fitting between a longer first alignment protruded portion 111 and the third alignment recessed portion 203 serves as a first stage of the second guidance. In other words, when the plug connector 201 is moved toward the receptacle connector 107, even if the plug connector 201 is not completely aligned with the receptacle connector 107, the plug connector is first in contact with the first alignment protruded portion 111, and through fitting between the first alignment protruded portion 111 with an arc front edge and the third alignment recessed portion 203, the plug connector 201 can be automatically corrected and inserted by an insertion force.

In addition to implementing the first stage of the second guidance by using the first alignment structure, in some embodiments, a second stage of the second guidance is further implemented by using the second alignment structure. In some embodiments, the second alignment structure includes a first alignment recessed portion 113 disposed between the second alignment protruded portions 112 of the receptacle alignment portion 108B and a third alignment protruded portion 206 disposed on the plug alignment portion 202B. Specifically, as shown in FIG. 5, two first alignment protruded portions 111 are adjacent to two sides of the receptacle alignment portion 108B, two second alignment protruded portions 112 are located between the first alignment protruded portions 111, and a first alignment recessed portion 113 exists between the two second alignment protruded portions 112. A depth of the first alignment recessed portion depends on the length L112 by which the second alignment protruded portion 112 protrudes. The first alignment recessed portion 113 is configured to fit and to be aligned with the third alignment protruded portion 206 on the plug connector 201. The third alignment protruded portion 206 is located between two fourth alignment recessed portions 204. A length of the third alignment protruded portion depends on a depth D204 of the fourth alignment recessed portion 204. In some embodiments, after the first alignment protruded portion 111 enters the third alignment recessed portion 203, if the plug connector 201 is still not completely aligned with the receptacle connector 107, the third alignment protruded portion 206 of the plug connector 201 may be in contact with the second alignment protruded portions 112 on two sides of the first alignment recessed portion 113 of the receptacle connector 107. However, through fitting between the first alignment recessed portion 113 and the third alignment protruded portion 206, the plug connector 201 can still be automatically corrected and inserted by an insertion force. This is the second stage of the second guidance.

In addition to the alignment mechanism of the recessed and protruded structures provided above, in some embodiments, in the present disclosure, smoothness of insertion of the pluggable module 2 into the receptacle module 1 and mating accuracy can be further improved through a structural tolerance design. In some embodiments, a fit tolerance between the first alignment structures is greater than a fit tolerance between the second alignment structures. For example, in the first stage of the second guidance, that is, when the first alignment protruded portion 111 is aligned with the third aligning recessed portion 203, a fit tolerance between the two is relatively large, so as to allow the pluggable module 2 to be further inserted into the receptacle module 1 loosely. In the second stage of the second guidance, that is, when the first alignment recessed portion 113 is aligned with the third alignment protruded portion 206, a fit tolerance system between the two is relatively small, so as to ensure that the pluggable module 2 is accurately mated with the receptacle module 1.

In some embodiments, the plug terminal portion 202A has a plurality of plug terminals 207. The plug terminal 207 includes a plurality of second contact portions 208. In some embodiments, the second contact portion 208 extends toward the second mating end 202 and is suspended on the plug terminal portion 202A without being supported. Through accurate mating between the pluggable module 2 and the receptacle module 1, all receptacle terminals 109 of the receptacle terminal portion 108A are in contact with all plug terminals 207 of the plug terminal portion 202A. For example, the first contact portion 110 is in accurate contact with the second contact portion 208 to implement correct electrical transmission.

In some embodiments, a side of the third alignment recessed portion 203 further includes a side opening 205 configured to accommodate the first alignment protruded portion 111. The side opening 205 is disposed in the housing 200 of the pluggable module 2. According to the structure, when a user mistakenly inserts the pluggable module 2 into the receptacle module 1 upside down, the front end of the housing 200 of the pluggable module 2 (a portion located on two sides of the plug terminal portion 202A) reaches a front end of the first alignment protruded portion 111 and cannot be inserted further. In this case, the user understands that the pluggable module 2 is currently being inserted upside down. Therefore, the user withdraws the pluggable module 2 from the accommodation space 103, and reverses the pluggable module and then inserts the pluggable module 2 again, so that the pluggable module 2 can be prevented from being mistakenly inserted. In some embodiments, the second alignment protruded portion 112 can form a plate body 115 shown in FIG. 5, and may be aligned with and accommodated in an accommodation slot 210 of the plug alignment portion 202B of the plug connector 201.

Figure 6:
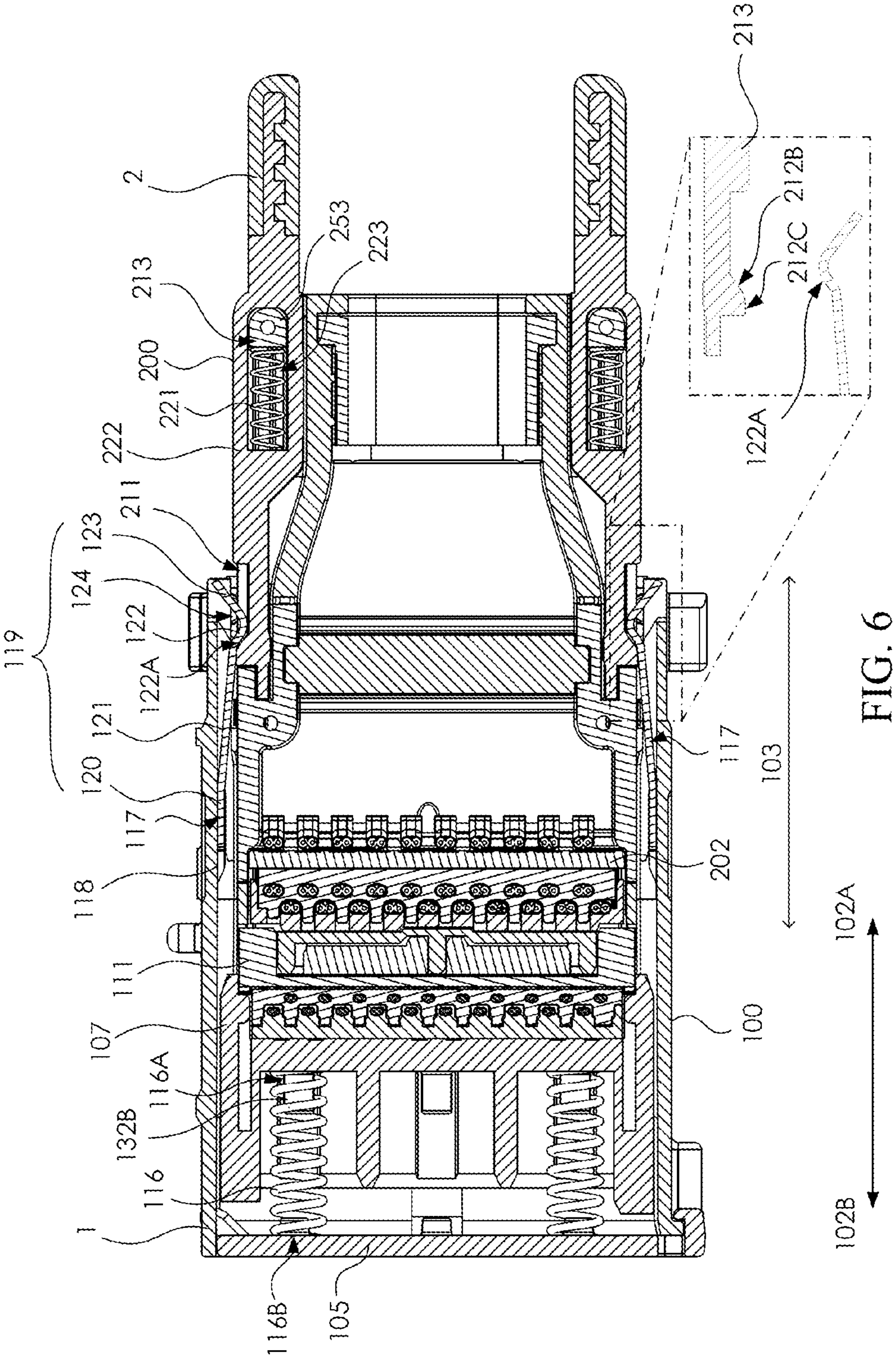
FIG. 6 is a partial structural cross-sectional view of an embodiment of a pluggable module and a receptacle module after mating.
Figure 7A:
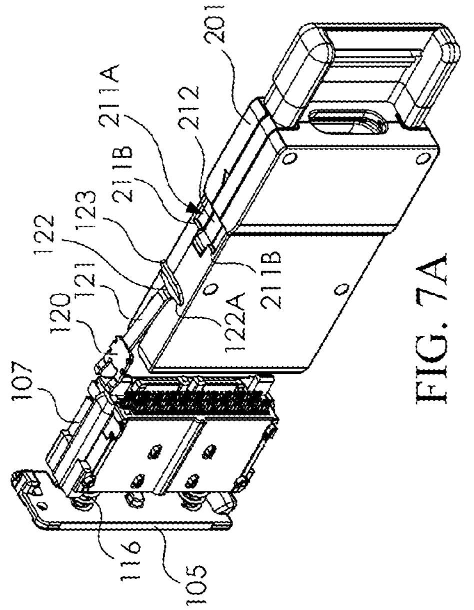
FIG. 7A is a partial perspective view of an embodiment of a pluggable module and a receptacle module before mating.
Figure 7B:
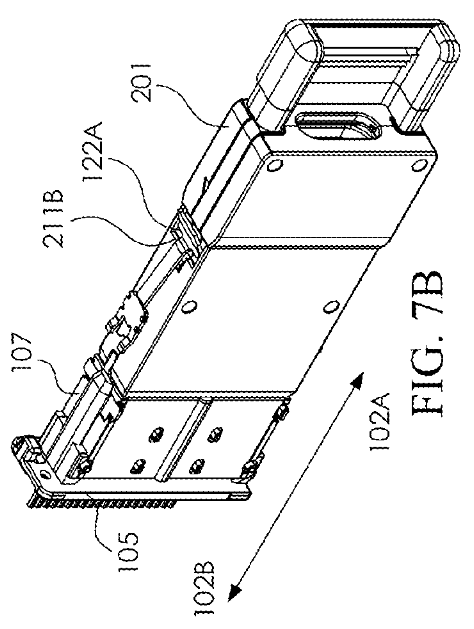
FIG. 7B is a partial perspective view of an embodiment of a pluggable module and a receptacle module during mating.

FIG. 6 and FIG. 7A to FIG. 7B are used to show a structure of the pluggable module 2 and the receptacle module 1 after mating is completed and a process of mating between the two according to the present disclosure. After the pluggable module 2 of the present disclosure is mated with the receptacle module 1, the pluggable module 2 may be fixed in the receptacle module 1 without falling off arbitrarily, and stable contact between the plug terminal 207 and the receptacle terminal 109 is maintained. Therefore, the fixing mechanism is implemented through at least a combination of the biasing spring 116 and the locking member 117. FIG. 6 is a partial structural cross-sectional view of the pluggable module 2 and the receptacle module 1 after mating. As shown in the figure, the receptacle module 1 includes a biasing spring 116 located between the receptacle connector 107 and the back plate 105. One end 116A of the biasing spring 116 abuts against the receptacle connector 107, and the other end 116B abuts against an inner surface of the back plate 105 for applying a spring load on the receptacle connector 107 toward the insertion end 102A of the cage 100. In some embodiments, for example, with reference to a state before the pluggable module 2 and the receptacle module 1 shown in FIG. 7A are mated, the biasing spring 116 has a preload to be applied to the receptacle connector 107.

During use of the connector assembly of the present disclosure, a user first inserts the pluggable module 2 into the receptacle module 1. However, the pluggable module usually exceeds a position at which the plug connector 201 of the pluggable module 2 is mated with and the receptacle connector 107 of the receptacle module 1 shown in FIG. 6 as a result of lack of sight, which is shown in FIG. 7B. Then, when the user stops applying a force to the pluggable module 2, the biasing spring 116 rebounds toward an end 116A at which the biasing spring is in contact with the receptacle connector 107, that is, pushes the receptacle connector 107 and the plug connector 201 mated with each other toward the insertion end 102A, until the pluggable module 2 is locked by the locking member. The receptacle connector and the plug connector are moved from a position in FIG. 7B to a position in FIG. 7C for completing mating. In this case, in the present disclosure, the design of the locking member 117 is used to prevent the pluggable module 2 from being pushed out of the receptacle module 1 as a result of rebound of the biasing spring 116, and lock the pluggable module 2 firmly.

As shown in FIG. 6, the receptacle module 1 includes a locking member 117. The locking member is disposed on a side wall 118 of the cage 100 in the insertion space 103 and extends from the side wall 118 into the insertion space 103 and toward the insertion end 102A. In some embodiments, the locking member 117 includes a locking elastic sheet 119. The locking elastic sheet 119 includes a fixing portion 120, an elastic arm 121, a locking portion 122, and a guiding section 123. The fixing portion 120 is assembled on the side wall 118. The elastic arm 121 is connected to the fixing portion 120 and extends into the insertion space 103 and toward the insertion end 102A. The locking portion 122 is connected to the elastic arm 121 and further extends into the insertion space 103. The guiding section 123 is connected to the locking portion 122. The structure of the guiding section 123 includes a protruded portion 124 which is formed through extending toward the side wall 118 and the insertion end 102A and folding into the insertion space 103 with the locking portion 122.

A position of the locking member 117 with respect to the receptacle module 1 is shown in FIG. 6. The pluggable module 2 has a locking fitting portion 211 located on the two opposite sides of the housing 200 of the pluggable module 2. In addition, with further reference to perspective view diagrams or exploded views of FIG. 7A to FIG. 7D and FIG. 16 below, the locking fitting portion 211 includes a locking recessed portion 211A on the two opposite sides of the housing 200. The locking recessed portion (see FIG. 7A) is composed of a structure of a first half cage 216A and a second half cage 216B (see FIG. 16) of the housing 200 recessed into the pluggable module 2 and a groove 212 (see FIG. 16) of an unlocking member 213. A structure of the unlocking member 213 is described later.

In some embodiments, the pluggable module 2 mated with the receptacle module 1 is locked through alignment of the locking fitting portion 211 of the pluggable module 2 with the locking member 117 of the receptacle module 1, and does not detach from the receptacle module 1. In some embodiments, the alignment is completed in the following manner: the pluggable module 2 pushes the receptacle connector 107 toward the outlet end 102B to compress the biasing spring 116, so that the receptacle connector 107 is moved toward the outlet end 102B to the locking member 117 to be mated with the locking fitting portion 211 of the pluggable module 2.

As shown in FIG. 7A, an end of the locking recessed portion 211A facing the outlet end 102B has two separated inner edges 211B. The inner edges 211B are used for the locking elastic sheet 119 to abut against so as to achieve locking. Specifically, in some embodiments, the locking elastic sheet 119 of the locking member 117 of the receptacle module 1 is in a locked state. The locking portion 122 of the locking elastic sheet 119 is wider than the elastic arm 121 and therefore has two inner edges 122A abutting against the inner edges 211B of the locking recessed portion 211A of the pluggable module 2 in the direction toward the outlet end 102B, so that the pluggable module 2 does not detach from the receptacle module 1.

Figure 7C:
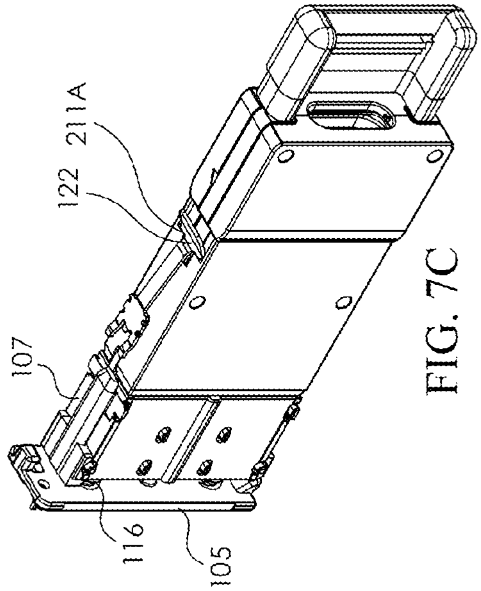
FIG. 7C is a partial perspective view of an embodiment of a pluggable module and a receptacle module after mating is completed.

Specifically, in the locking mechanism of the present disclosure, for a relative position change from FIG. 7A to FIG. 7C, when the pluggable module 2 is inserted into the receptacle module 1, the pluggable module is first in contact with the guiding section 123 of the locking elastic sheet 119, and pushes the locking elastic sheet 119 away from the insertion space 103 by pushing the guiding section 123, so as to form a sufficient space for the pluggable module 2 to enter the insertion space 103. Then, with the insertion of the pluggable module 2, the locking portion 122 of the locking elastic sheet 119 first falls into the locking recessed portion 211A but the locking is still not completed. Then, as a user releases the insertion of the pluggable module 2, due to a force applied by the biasing spring 116 to the plug connector 201 toward the insertion end 102A, the plug connector 201 is retracted toward the insertion end 102A until the two inner edges 122A of the locking portion 122 of the locking elastic sheet 119 abuts against the inner edges 211B of the locking recessed portion 211A.

Figure 16:
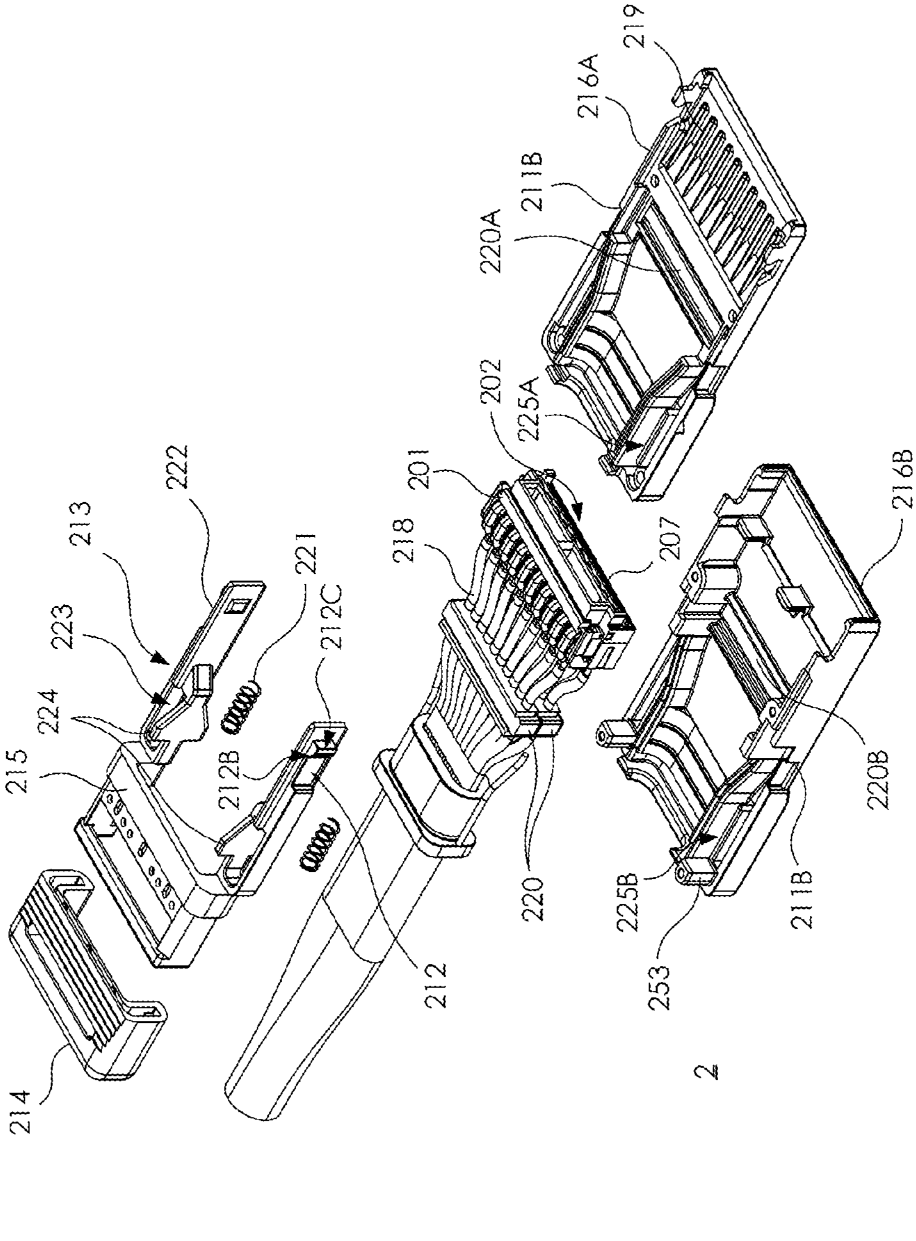
FIG. 16 is a perspective exploded view of an embodiment of a pluggable module.

In some embodiments, referring to the partial enlarged view shown in FIG. 6, the pluggable module 2 has an unlocking member 213, which includes an inclined unlocking surface 212B, a platform 212C, and a groove 212. For characteristics of the unlocking member 213, refer to the perspective view diagram shown in FIG. 16 below. As shown in FIG. 16, the unlocking member 213 includes side arms 222 adjacent to two sides of the pluggable module 2. The side arms 222 are parallel to the direction in which the pluggable module 2 is inserted into the receptacle module 1. In addition, the inclined unlocking surface 212B, the platform 212C, and the groove 212 are disposed one end of the side arm 222. In addition, any of the side arms 222 has a side arm accommodation slot 223 and a spring 221 disposed therein. In some embodiments, the unlocking member 213 may be pulled by a user to compress the spring 221 to act in a direction opposite to the insertion direction of the pluggable module 2 within a specific range. After the user releases the force, the spring 221 can rebound the unlocking member 213 to an initial position. According to the structure, when the pluggable module 2 is to be detached from the receptacle module 1, for example, as shown in FIG. 7D, the user may first pull the unlocking member 213, so that the inclined unlocking surface 212B shown in FIG. 6 pushes the locking elastic sheet 119 toward upper and lower sides of the receptacle module 1 to release the abutting relationship between the two inner edges 122A of the locking portion 122 of the locking elastic sheet 119 and the two inner edges 211B of the locking recessed portion 211A of the pluggable module 2, thereby releasing the locking.

Figure 7D:
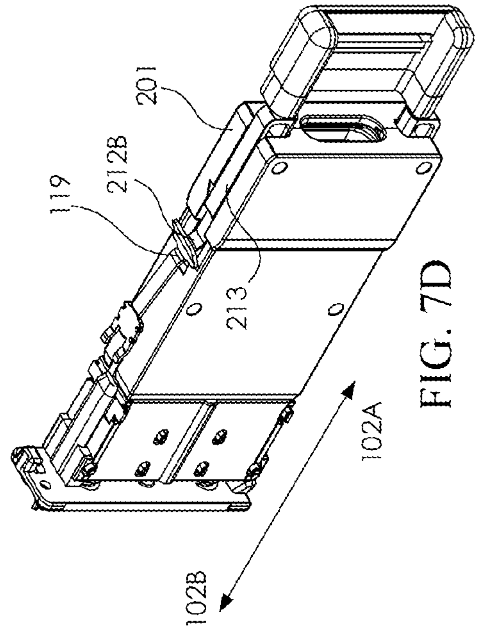
FIG. 7D is a partial perspective view of an embodiment of a pluggable module and a receptacle module during unlocking.

In summary, referring to the process of inserting the pluggable module into the locking/unlocking mechanism of the receptacle module disclosed in FIG. 7A, FIG. 7B, FIG. 7C, and FIG. 7D, the plug connector 201 of the pluggable module 2 is still not mated with the receptacle connector 107 of the receptacle module 1 in FIG. 7A. At this time, the locking portion 122 of the locking elastic sheet is still not inserted into the locking recessed portion 211A. As shown in FIG. 7B, as the plug connector 201 is inserted from the insertion end 102A toward the outlet end 102B, for example, when the user manually inserts the pluggable module 2 into the receptacle module 1, the plug connector 201 and the receptacle connector 107 are substantially mated in this process, and the receptacle connector 107 is pushed toward the outlet end 102B due to a force, so as to compress the biasing spring 116 until the receptacle connector 107 is close to or in contact with the back plate 105. The locking portion 122 of the locking elastic sheet 119 is also inserted into the locking recessed portion 211A at this stage, but does not abut against the inner edge 211B of the locking recessed portion 211A. As shown in FIG. 7C, when the user stops applying the insertion force to the pluggable module 2, the biasing spring 116 can rebound to push the receptacle connector 107 and the pluggable module 2 until the locking portion 122 abuts against the inner edge 211B of the locking recessed portion 211A, and the plug connector 201 and the receptacle connector 107 are in a mating state. In some embodiments, compared to the unmated state shown in FIG. 7A, in the mated state of the plug connector 201 and the receptacle connector 107 shown in FIG. 7C, the biasing spring 116 is compressed and bears a larger load. Finally, as shown in FIG. 7D, during an unlocking stage, as the user pulls the unlocking member 213, the locking elastic sheet 119 originally abutting against the inner edge 211B of the locking recessed portion 211A can be lifted off the locking recessed portion 211A by the inclined unlocking surface 212B, so as to release the locking relationship, thereby detaching the pluggable module from the receptacle module.

Figure 8:
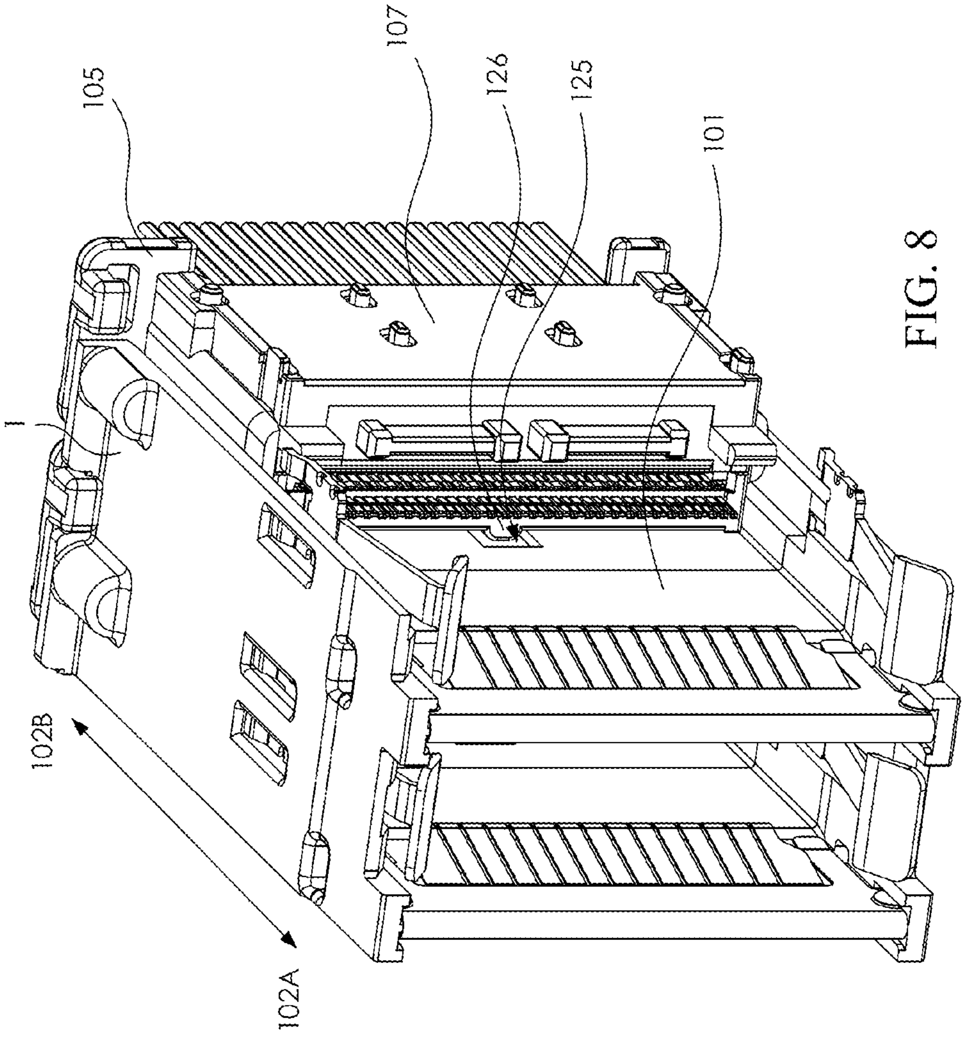
FIG. 8 is a perspective view of an embodiment of a receptacle module.

As shown in FIG. 8, in some embodiments, a limiting slot 125 may be provided on the wall plate 101 of the cage. Corresponding to the limiting slot 125, the receptacle connector 107 has a pair of alignment protruding bars 126 on a side surface adjacent to the wall plate 101 on which the limiting slot 125 is provided. When the receptacle connector 107 is not connected to the plug connector 201 and is at an initial position, the receptacle connector 107 is subjected to the preload force of the biasing spring 116, so that a front end of the alignment protruding bar 126 abuts against a front inner end of the limiting slot 125. In addition, when the receptacle connector 107 is in a use state, that is, when the pluggable module 2 is inserted into the receptacle module 1, since the receptacle connector 107 is pushed toward the biasing spring 116 that applies the force, the alignment protruding bar 126 also moves toward the outlet end 102B along the limiting slot 125 to provide a guiding and limiting effect. In addition, as described above, when the pluggable module 2 is mated with the receptacle module 1, that is, when the receptacle connector 107 is mated, the pluggable module is closer to the back plate 105 than the initial position, and the biasing spring 116 is further compressed with respect to the preload to provide a large load to be applied to the mating between the receptacle connector 107 and the plug connector 201, so that contact between the receptacle terminal 109 and the plug terminal 207 is more stable.

Figure 9:
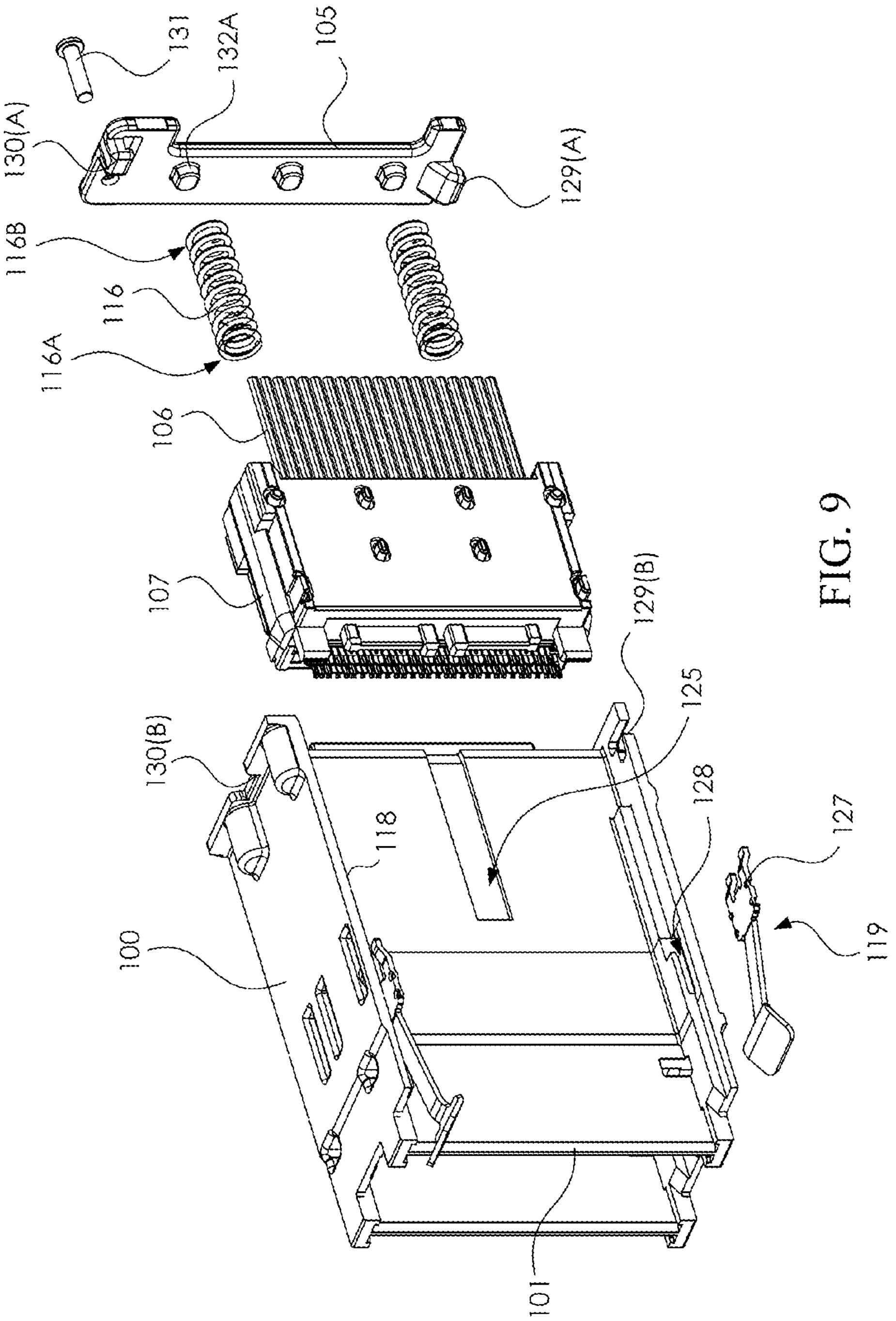
FIG. 9 is a perspective exploded view of an embodiment of a receptacle module.

As shown in FIG. 9, in some embodiments, the locking elastic sheet 119 may include a plurality of interference blocks 127 at the fixing portion 120 thereof, and the cage 100 has a fixing slot 128 at a position inside with respect to a position at which the locking elastic sheet 119 is mounted. The fixing portion 120 of the locking elastic sheet 119 is inserted into the fixing slot 128 and fixed through interference between a wall surface inside the fixing slot 128 and the interference block 127.

Figure 10:
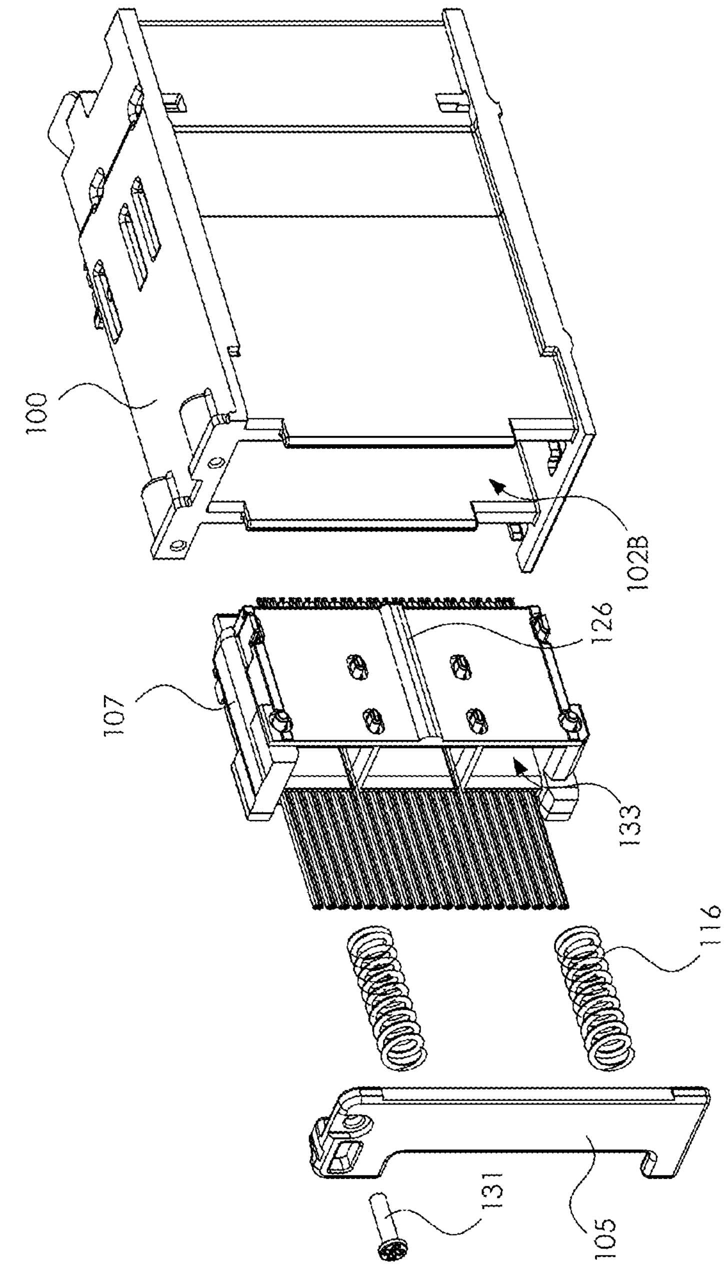
FIG. 10 is a perspective exploded view of an embodiment of a receptacle module.

As shown in FIG. 9 and FIG. 10, in some embodiments, the position at which the back plate 105 and the cage 100 are mated has a first buckling set 129 and a second buckling set 130. Any of the buckling sets includes a buckling block and a buckling slot corresponding to each other. For example, the first buckling set 129 includes a buckling block 129A close to a lower side of the back plate 105, which may be mated with a buckling slot 129B provided at a lower side of the cage 100. The second buckling set 130 includes a buckling block 130A close to an upper side of the back plate 105, may be mated with a buckling slot 130B provided at the upper side of the cage 100. In some embodiments, the back plate 105 may be first mated with the buckling slot 129B provided on the cage 100 through the buckling block 129A close to the lower side, and then mated with the buckling slot 130B provided on the cage 100 through the buckling block 130A close to the upper side. In some embodiments, the back plate 105 and the cage 100 may be further secured by using a screw 131.

As shown in FIG. 9 and FIG. 10, in some embodiments, an inner surface of the back plate 105 facing inside of the cage 100 may include a plurality of protruding posts 132A close to one end 116B of the biasing spring and configured to penetrate the biasing spring 116 to position the biasing spring 116. In some embodiments, a protruding post 132B (see FIG. 6 above) is further disposed inside the receptacle connector 107. The protruding post penetrates one end 116A of the biasing spring 116.

As shown in FIG. 10, in some embodiments, the receptacle connector 107 has a plurality of biasing spring receiving slots 133 inside, and the biasing springs 116 are respectively located in different biasing spring receiving slots 133. The above alignment protruding bar 126 shown in FIG. 8 may also be completely seen in a view of FIG. 10.

Figure 11:
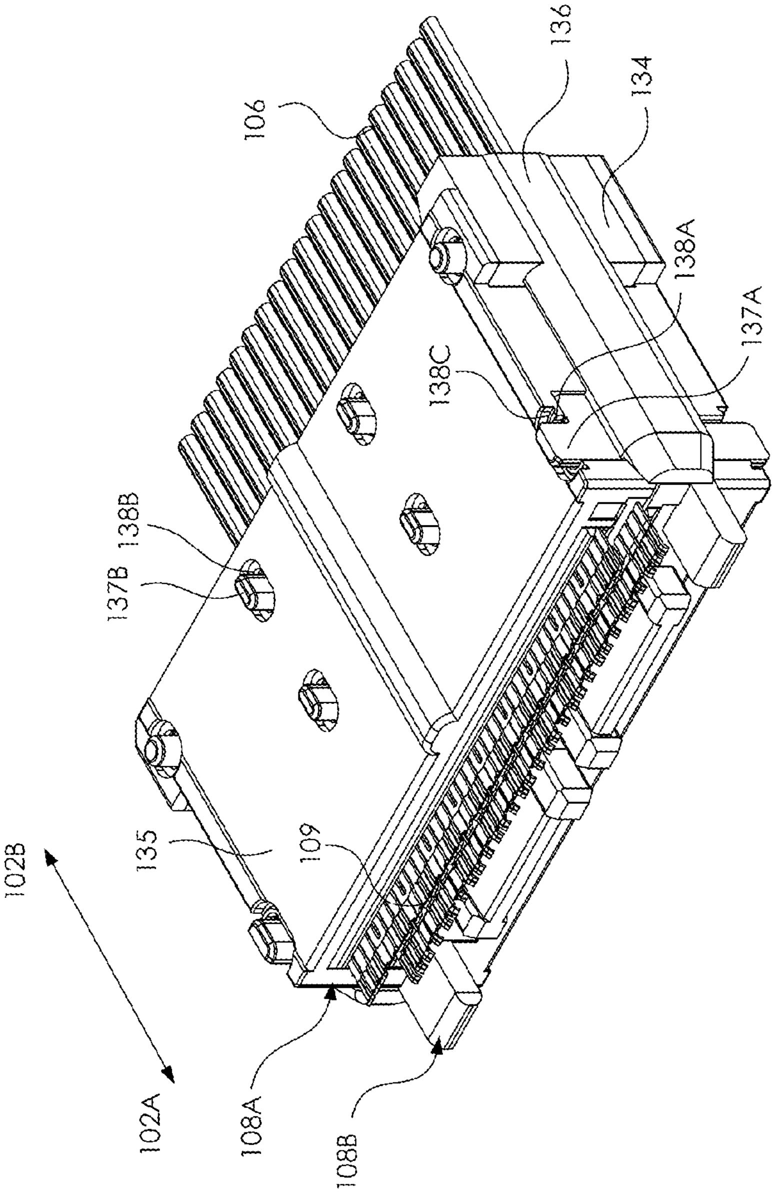
FIG. 11 is a perspective view of a receptacle connector according to an embodiment of the present disclosure.

As shown in FIG. 11, in some embodiments, the receptacle connector 107 includes a first half housing 134, a second half housing 135, and a receptacle housing 136. The first half housing 134 and the second half housing 135 are respectively located on two sides of the receptacle housing 136, and after assembling, the receptacle housing 136 may be located between the first half housing 134 and the second half housing 135 to complete main assembling of the receptacle connector 107. In some implementations, one side of the receptacle housing 136 close to the insertion end 102A is assembled with the receptacle terminal 109, and the receptacle terminal 109 is electrically connected to the first wire 106. In some embodiments, the first wire 106 extends from the other side of the receptacle housing 136 toward the outlet end 102B, and passes through the outlet opening 105A of the back plate 105 (see FIG. 2 above).

As shown in FIG. 11, in some embodiments, the receptacle housing 136 has a plurality of hot-melt posts 137A and 137B protruding from corresponding holes 138A and 138B on the first half housing 134 and the second half housing 135. In addition, depending on positions of the hot-melt posts, a whole post body may be corresponding to a whole hole or a half post body may be corresponding to a half hole. In some embodiments, an inner edge of the hole 138A has a hot-melt trench 138C configured to melt the hot-melt post 137A and accommodate melted hot-melt materials to fix and bond the first half housing 134, the second half housing 135, and the receptacle housing 136.

Figure 12:
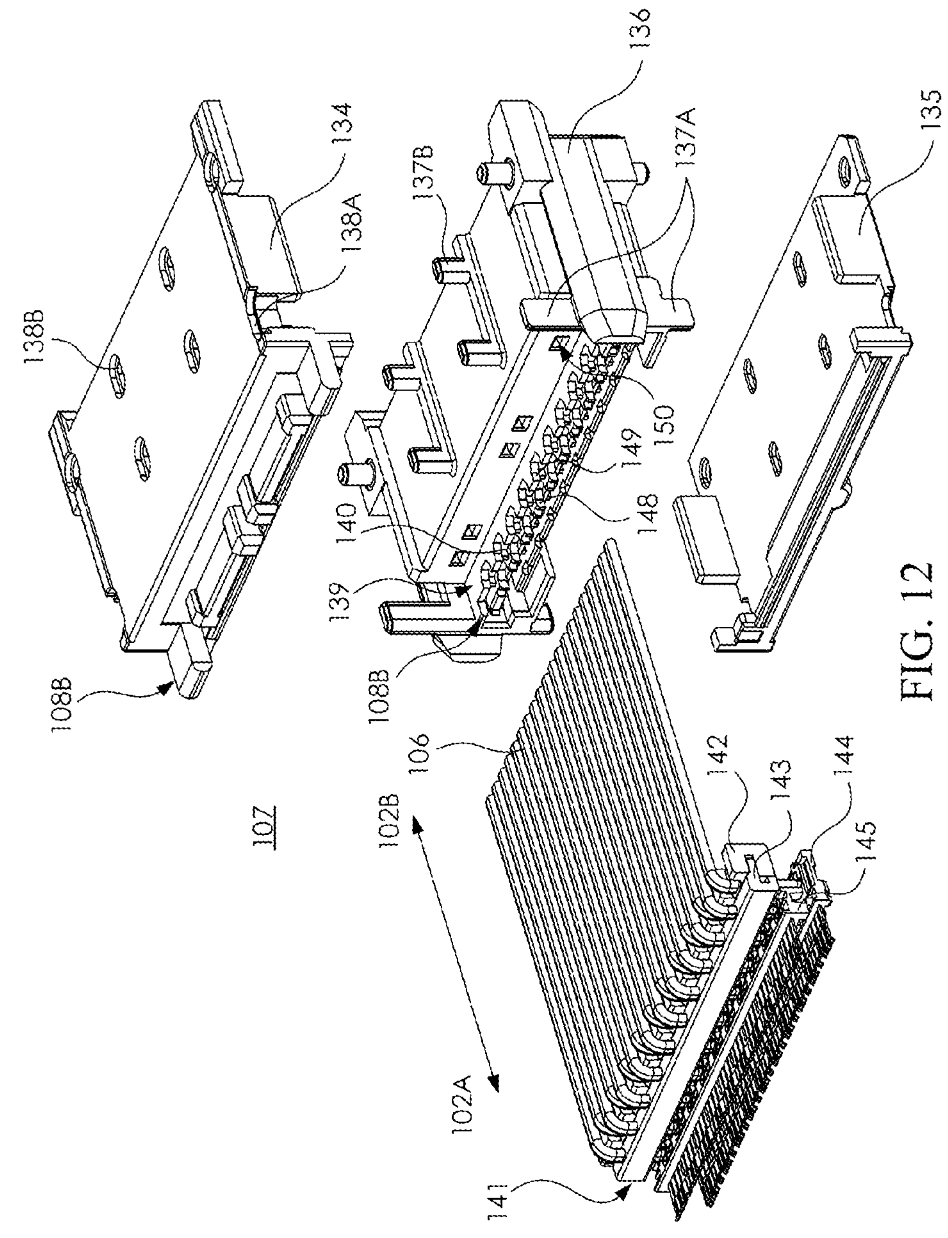
FIG. 12 is a perspective exploded view of an embodiment of a receptacle connector.

As shown in FIG. 12, the receptacle housing 136 is located between the first half housing 134 and the second half housing 135, and one side of the receptacle housing 136 has a wire accommodation structure 139. In some embodiments, the wire accommodation structure 139 has a plurality of wire accommodation recessed portions 140 configured to accommodate and arrange first wires 106 passing through the receptacle housing 136. In some embodiments, the receptacle terminal portion 108A is disposed on one side of the receptacle housing 136, and the receptacle alignment portion 108B is disposed on one side of the first half housing 134.

In some embodiments, an end of the receptacle connector 107 close to the insertion end 102A includes a first terminal assembly 141. In some embodiments, the first terminal assembly 141 includes a first terminal module 144, a second terminal module 145, a first wire management member 142, and a second wire management member 143. In some embodiments, each column of receptacle terminals 109 in the first terminal module 144 and the second terminal module 145 are respectively inserted into terminal brackets 163 and 164 through insert molding. The first wire management member 142 and the second wire management member 143 are configured to connect the first wires 106 and arrange the first wires into two columns, and distribute the first wires 106 to the first terminal module 144 and the second terminal module 145, that is, connect the first wires 106 entering the first terminal module 144 and the second terminal module 145 to corresponding receptacle terminals 109. Correspondingly, the above wire accommodation recessed portion 140 may include a plurality of first terminal module assembling slots 148 and a plurality of second terminal module assembling slots 149 respectively configured to accommodate and fixedly connected to the first terminal module 144 and the second terminal module 145. In some embodiments, the first terminal module 144 and the second terminal module 145 are assembled in the first terminal module assembling slot 148 and the second terminal module assembling slot 149 by using the terminal brackets 163 and 164.

Figure 13:
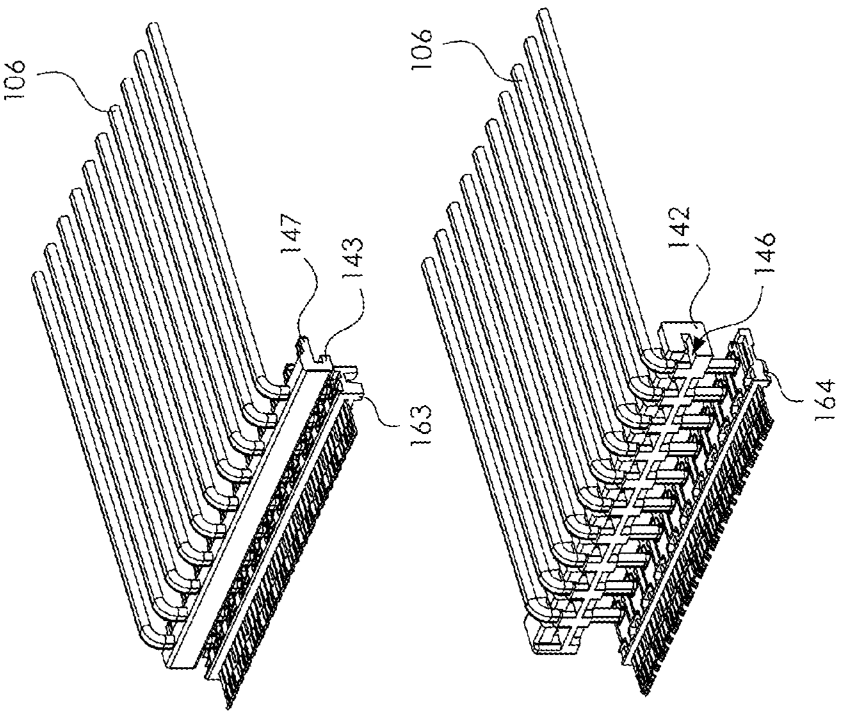
FIG. 13 is a partial perspective exploded view of an embodiment of a receptacle connector.

As shown in FIG. 12 and FIG. 13, in some embodiments, the first wire management member 142 has a plurality of first insertion holes 146 that may correspond to a plurality of first insertion posts 147 of the second wire management member 143, so that the first wire management member and the second wire management member can be mated and fixed, thereby effectively using the space of the receptacle connector and guaranteeing density of an electrical transmission line. Referring to FIG. 12 again, in some embodiments, the receptacle housing 136 further includes a housing hole 150 corresponding to a part of the first insertion post 147, so that the part of the first insertion post 147 is not only inserted into the first insertion hole 146, but also further inserted into the housing hole 150, so that the first terminal assembly 141 can be fixed to one end of the receptacle housing 136.

Figure 14:
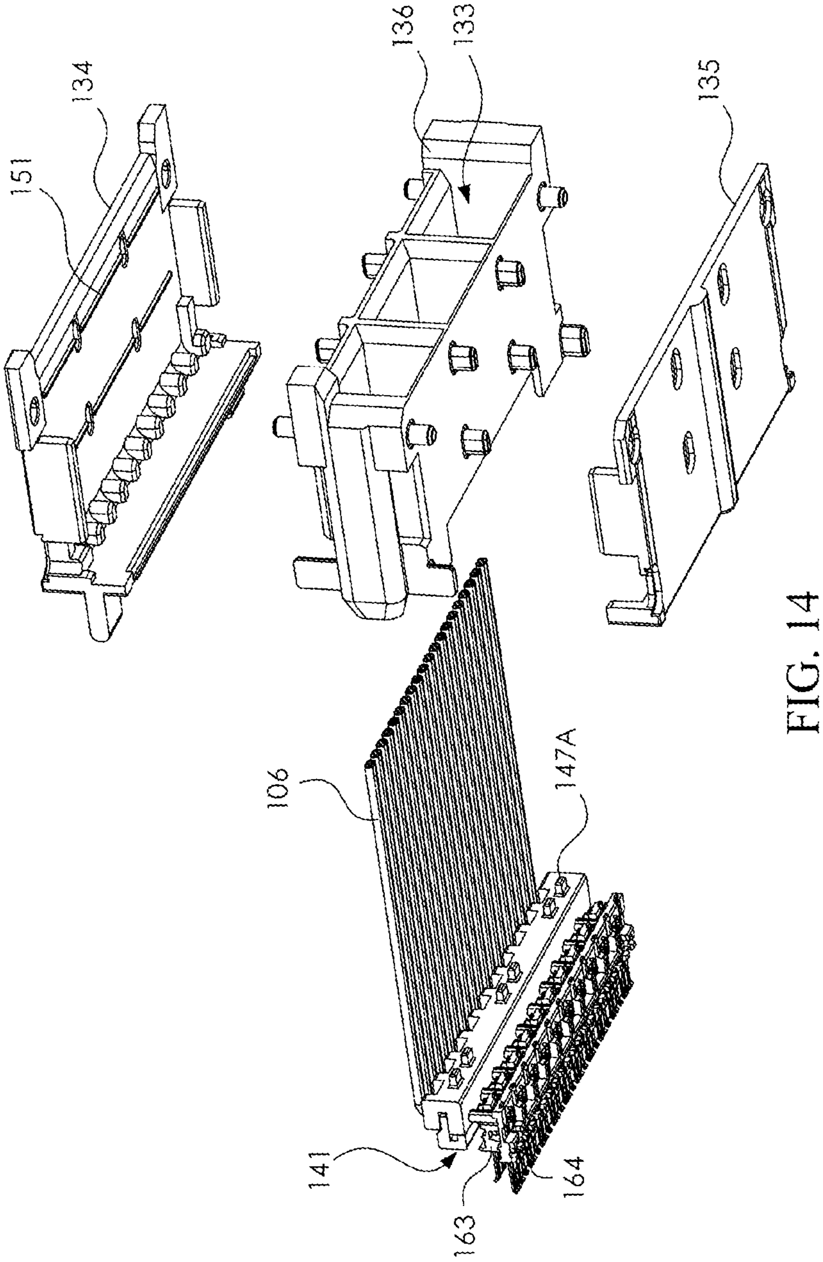
FIG. 14 is a perspective exploded view of an embodiment of a receptacle connector.

As shown in FIG. 12 and FIG. 14, in other embodiments, all of the first insertion posts 147 of the second wire management member 143 have the same length without penetrating the first wire management member 142, but an additional first insertion post 147A is disposed on a surface of the first wire management member 142 close to the receptacle housing 136, which corresponds to the housing hole 150, so that the first terminal assembly 141 can be fixed to one end of the receptacle housing 136.

As shown in FIG. 14, in some embodiments, a plurality of wire pressing ribs 151 may be provided on a side surface of the first half housing 134 facing the receptacle housing 136, which are configured to assist in fixing the first wire 106 passing through a space between the first half housing 134 and the receptacle housing 136 so that the first wire 106 is tightly clamped between the first half housing 134 and the receptacle housing 136.

Figure 15:
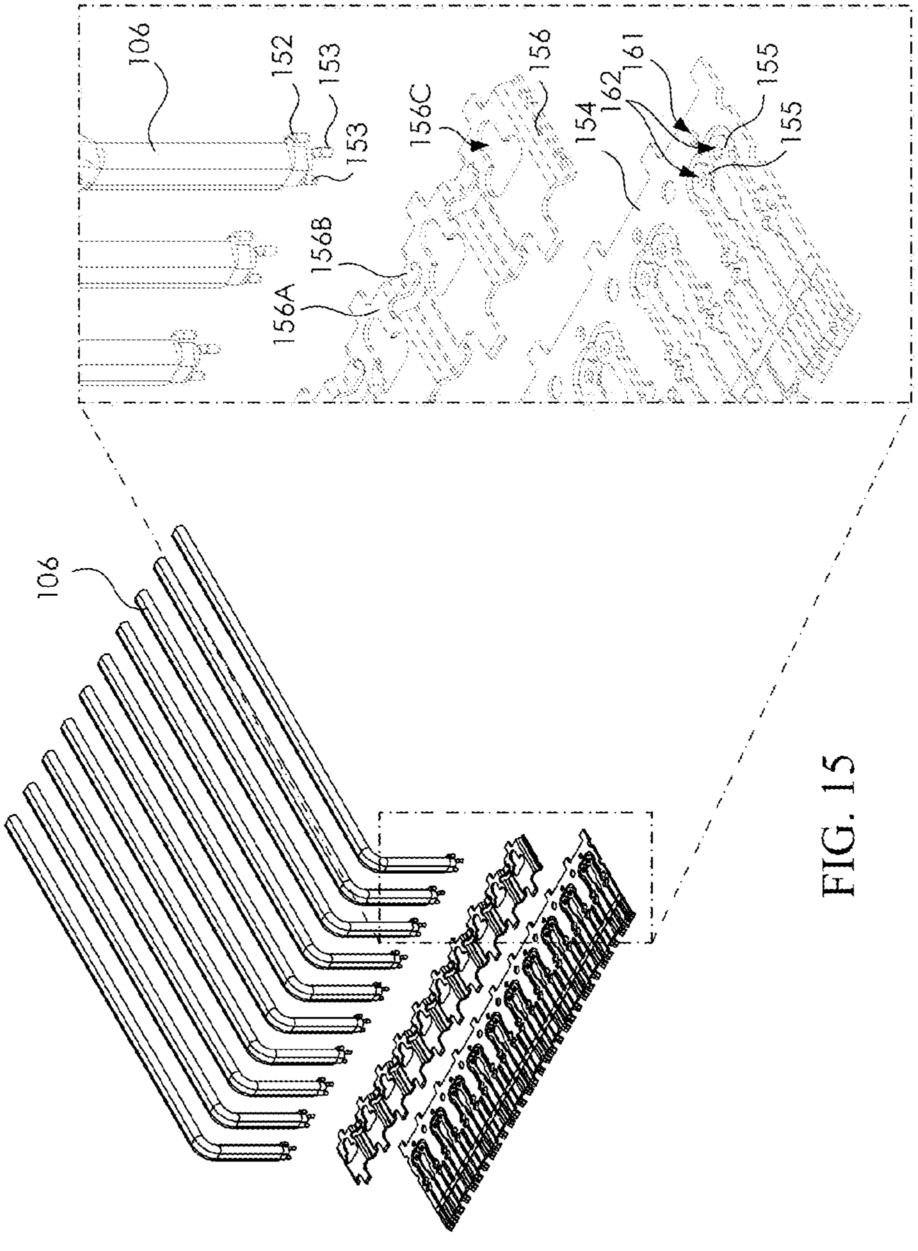
FIG. 15 is a partial perspective exploded view of a receptacle connector.

As shown in FIG. 15, in some embodiments, any of the first wires 106 may include a ground wire 152 and two signal wires 153 to be respectively connected to one ground terminal 154 and two signal terminals 155. In some embodiments, the ground wire 152 and the signal wire 153 are welded to wiring holes 161 and 162 of the ground terminal 154 and the signal terminal 155, so as connect a wire body and the terminal. In some embodiments, the one ground wire 152 and the two signal wires 153 in each of the first wires 106 are arranged in a triangle, and correspondingly, the wiring holes 161 and 162 are also arranged in a triangle. In some embodiments, the ground terminal 154 is a continuous metal sheet body integrally stamped, and the ground terminal 15 has a plurality of U-shaped openings configured to individually accommodate a pair of signal terminals therein. In some embodiments, a shielding sheet 156 may be provided on the ground terminal 154. The shielding sheet 156 includes a plurality of protrusion portions 156A and a plurality of recess portions 156B and is a wave-shaped sheet body. The shielding sheet 156 is in contact with the ground terminal 154 through the recess portion 156B, and shields the signal terminal 155 through the protrusion portion 156A. In some embodiments, the shielding sheet 156 further includes a plurality of through holes 156C for the ground wire 152 and the signal wire 153 to pass through.

As shown in FIG. 16, the housing 200 of the pluggable module 2 may include a covering block 214, a connecting frame 215 connecting two side arms 222, a first half cage 216A, and a second half cage 216B. In some embodiments, the covering block 214 is inserted into and covers one end of the connecting frame 215. In some embodiments, the connecting frame 215 and the two side arms 222 may be integrally formed through metal die casting. In some embodiments, the two side arms 222 of the connecting frame 215 and the plug connector 201 are combined by the first half cage 216A and the second half cage 216B from opposite sides (for example, an upper side and a lower side), so that the plug connector 201 is assembled and covered in the first half cage 216A and the second half cage 216B, and the second mating end 202 of the plug connector 201 is exposed from one end of the first half cage 216A and the second half cage 216B after assembling.

As described above, in some embodiments, the second mating end 202 of the plug connector 201 has a plug terminal portion 202A and a plug alignment portion 202B (see FIG. 5 above), and the plug terminal portion 202A has a plurality of plug terminals 207 each electrically connected to a second wire 218.

In some embodiments, an inner side surface of the first half cage 216A may include a plurality of wire management ditches 219 to assist positioning the second wire 218. In some embodiments, the pluggable module 2 may further include two third wire management members 220. Any of the third wire management members 220 may be configured to arrange one column of second wires 218. In addition, the third wire management members 220 may be arranged through vertical stacking so that the second wires 218 are neatly arranged in both a horizontal direction and a vertical direction. In some embodiments, recessed portions 220A and 220B configured to accommodate the third wire management members 220 are disposed on the first half cage 216A and the second half cage 216B. The above structural features of the first half cage 216A and the second half cage 216B may be interchanged or be the same in some other embodiments. In some embodiments, the second half cage 216B includes a plurality of connecting posts 253 passing through the side arm accommodation slot 223 on the side arm 222 during assembling of the pluggable module 2, and a side wall of the connecting post abuts against one end of the spring 221. For the connection relationship, refer to the cross-sectional view of FIG. 6 above. In other words, in the side arm accommodation slot 223, two ends of the spring 221 respectively abut against the side arm accommodation slot 223 and the side wall of the connecting post 253.

As described above, the pluggable module 2 may pull the unlocking member 213 so that the inclined unlocking surface 212B of the unlocking member 213 pushes the locking elastic sheet 119, so that the locking elastic sheet 119 is moved outward from an inner side of the locking recessed portion 211A to be away from the locking recessed portion 211A, that is, detaches away from the inner edge 211B of the locking recessed portion 211A to enter an unlocked state (see FIG. 7D above). As shown in FIG. 16, the inner edge 211B is a depression close to an edge in the structure of the first half cage 216A and the second half cage 216B. After being combined, the first half cage 216A and the second half cage 216B may form the locking recessed portion 211A shown in FIG. 7A above with the groove 212 on the side arm 222.

In some embodiments, the unlocking member 213 is a part of the connecting frame 215 and is also formed through metal die casting. In some embodiments, an inner side of the unlocking member 213 may have a guiding protruding sheet 224. The guiding protruding sheets 224 are inserted into sliding slots 225A and 225B provided on inner side walls of the first half cage 216A and the second half cage 216B, so that after the first half cage 216A and the second half cage 216B are combined, the unlocking member 213 can slide back and forth with respect to the first half cage 216A and the second half cage 216B along the sliding slots 225A and 225B through the guiding protruding sheet 224.

Figure 17:
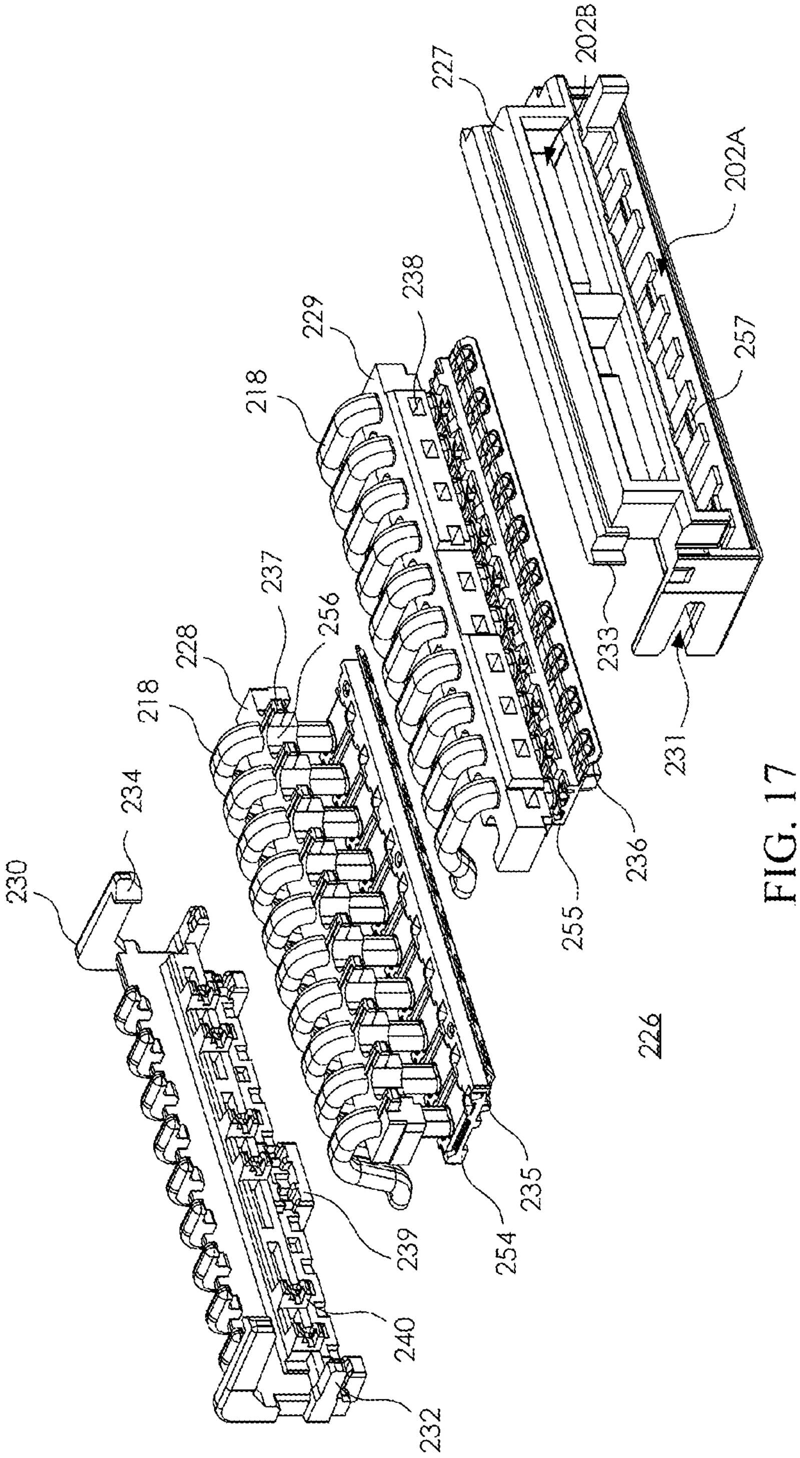
FIG. 17 is a partial perspective exploded view of an embodiment of a plug connector.
Figure 18:
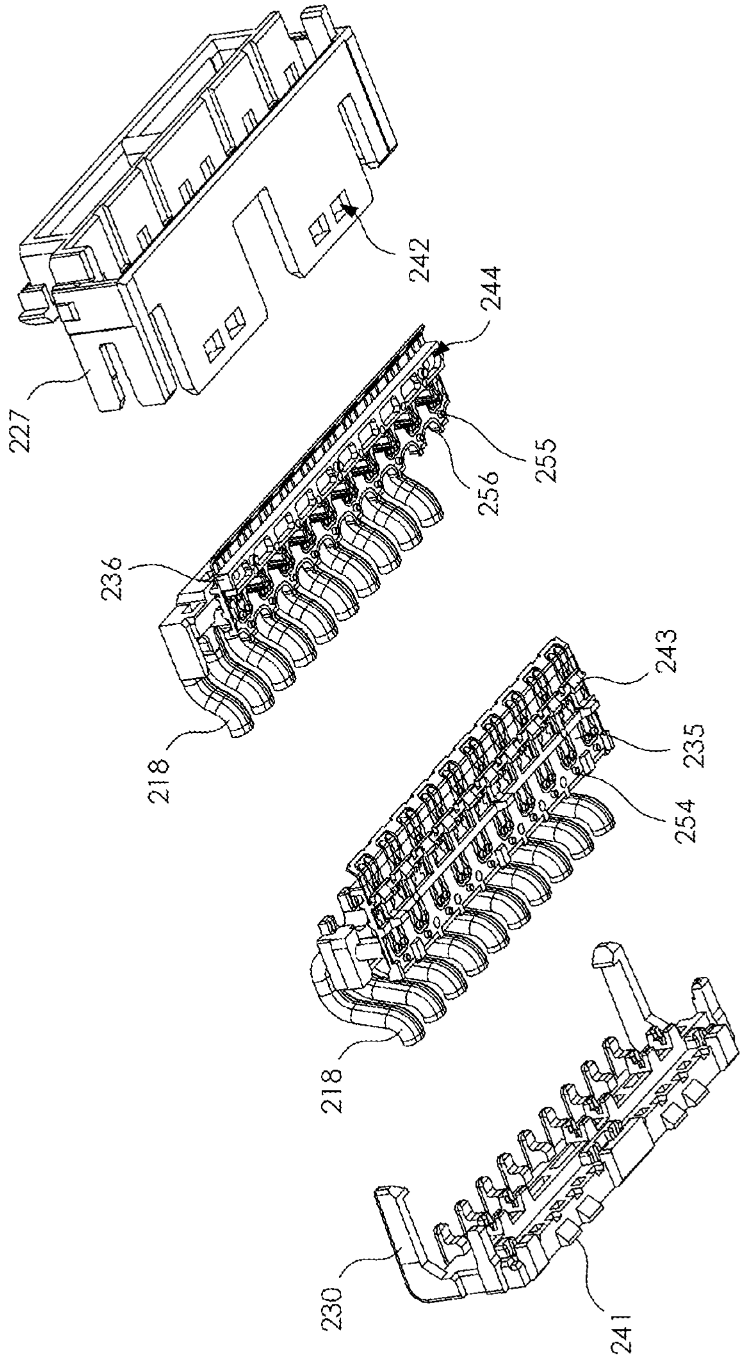
FIG. 18 is a partial perspective exploded view of an embodiment of a plug connector.

As shown in FIG. 17 and FIG. 18, in some embodiments, an end of the plug connector 201 close to the second mating end 202 includes a second terminal assembly 226. The second terminal assembly 226 includes a fourth terminal module 235, a fifth terminal module 236, a front seat 227, a fourth wire management member 228, a fifth wire management member 229, and a back seat 230. In some embodiments, the fourth wire management member 228 and the fifth wire management member 229 may be disposed in an inner space of a plug housing formed after the front seat 227 and the back seat 230 are assembled. In some embodiments, two sides of the front seat 227 respectively include a front seat insertion hole 231, and two sides of the back seat 230 respectively include a back seat insertion sheet 232. The front seat insertion hole 231 is opposite to the back seat insertion sheet 232 so as to be aligned and mated. In some embodiments, the two sides of the front seat 227 further respectively include a front seat buckling portion 233, and the two sides of the back seat 230 further respectively include a back seat buckling member 234. The front seat buckling portion 233 is opposite to the back seat buckling member 234 so as to be aligned and mated.

In some embodiments, the fourth wire management member 228 and the fifth wire management member 229 of the second terminal assembly 226 are configured to connect the second wires 218 and arrange the second wires into two columns and distribute the second wires 218 to the fourth terminal module 235 and the fifth terminal module 236, that is, connect the second wires 218 entering the fourth terminal module 235 and the fifth terminal module 236 to corresponding plug terminals 207. In some embodiments, each column of plug terminals 207 in the fourth terminal module 235 and the fifth terminal module 236 are respectively inserted into terminal brackets 254 and 255 through insert molding.

In some embodiments, the fourth wire management member 228 has a plurality of second insertion posts 237 that may correspond to a plurality of second insertion holes 238 of the fifth wire management member 229, so that the fourth wire management member and the fifth wire management member can be mated and fixed, thereby effectively using the space between front seat 227 and the back seat 230 and guaranteeing the density of the electrical transmission line. In addition, after the second wires 218 are bundled, the second wires are electrically connected to the plug terminal 207 of the plug terminal portion 202A.

In some embodiments, a side surface of the back seat 230 facing the front seat 227 may include a plurality of fourth terminal module assembling slots 239 and a plurality of fifth terminal module assembling slots 240 respectively configured to assemble the fourth terminal module 235 and the fifth terminal module 236. In some embodiments, the fourth terminal module 235 is assembled in the fourth terminal module assembling slot 239 by using a back end of the terminal bracket 254 (see FIG. 18 below). The fifth terminal module 236 is assembled in the fifth terminal module assembling slot 240 by using a back end of the terminal bracket 255 (see FIG. 18 below), so that the fifth terminal module 236 is vertically stacked above the fourth terminal module 235. In some embodiments, the fifth terminal module 236 has a plurality of ditches 256 for accommodating the second wire 218 connected to the fourth terminal module.

As shown in FIG. 17 and FIG. 18, in some embodiments, a bottom surface of the back seat 230 includes a plurality of first buckling blocks 241 corresponding to a plurality of first buckling holes 242 on a bottom surface of the front seat 227 to further strengthen fixing between the back seat and the front seat. In some embodiments, a bottom surface of the terminal bracket of the fourth terminal module 235 includes a plurality of second buckling blocks 243 corresponding to the buckling blocks 257 disposed on the front seat 227.

Figure 19:
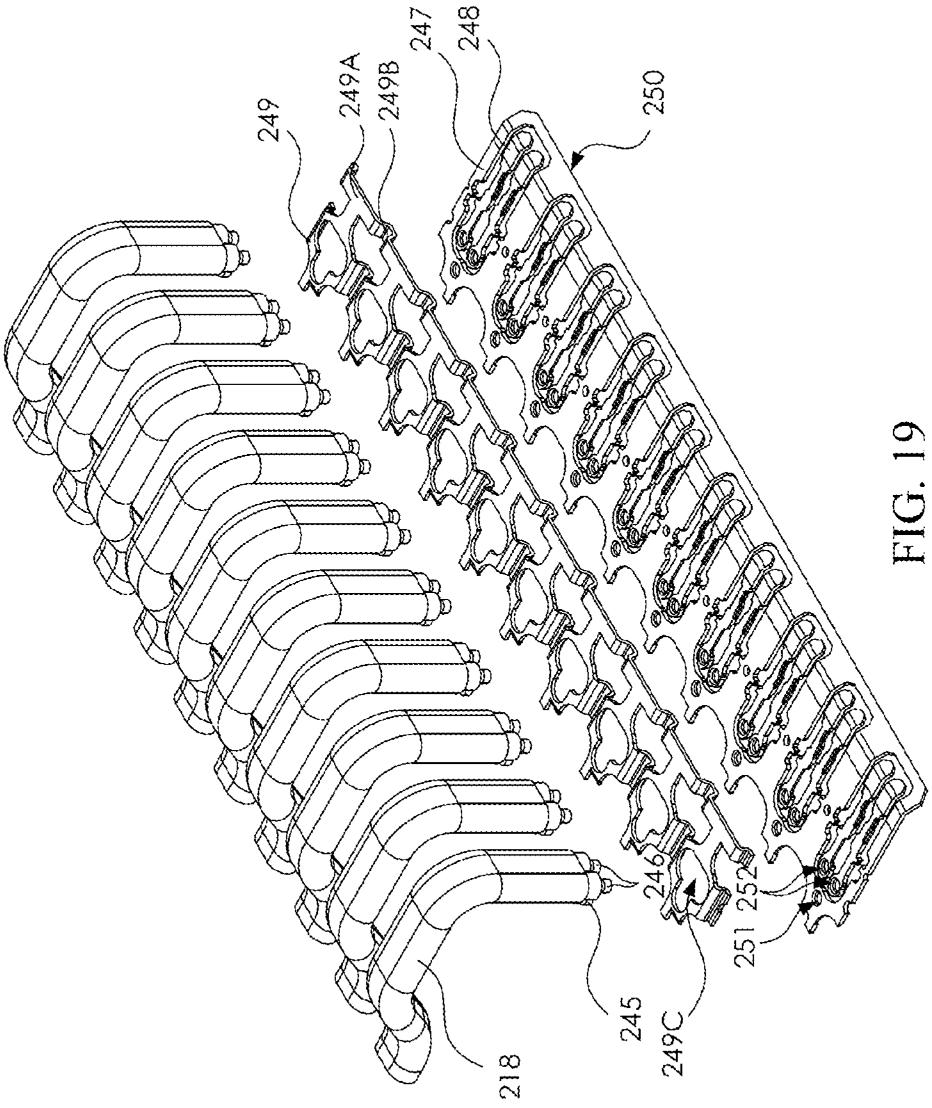
FIG. 19 is a partial perspective exploded view of an embodiment of a plug connector.

As shown in FIG. 19, in some embodiments, any of the second wires 218 may include one ground wire 245 and two signal wires 246 to be respectively connected to one ground terminal 247 and two signal terminals 248. In some embodiments, the ground wire 245 and the signal wire 246 are respectively welded to wiring holes 251 and 252 of the ground terminal 247 and the signal terminal 248. In some embodiments, the ground wire 245 and the signal wires 246 are arranged in a triangle, and correspondingly, the wiring holes 251 and 252 are also arranged in a triangle. In some embodiments, the ground terminal 247 is a continuous sheet body integrally formed, and a shielding sheet 249 may be provided on the ground terminal 247. The shielding sheet 249 includes a plurality of protrusion portions 249A and a plurality of recess portions 249B and is a wave-shaped sheet body. The shielding sheet 249 is in contact with the ground terminal 247 through the recess portion 249B, and shields the signal terminal 248 through the protrusion portion 249A. In some embodiments, the shielding sheet 249 further includes a plurality of through holes 249C for the ground wire 245 and the signal wire 246 to pass through. In some embodiments, the ground terminal 247 is connected as a complete sheet at a front end 250 thereof, and each pair of signal terminals 248 are surrounded by the ground terminal 247.

Figure 20:
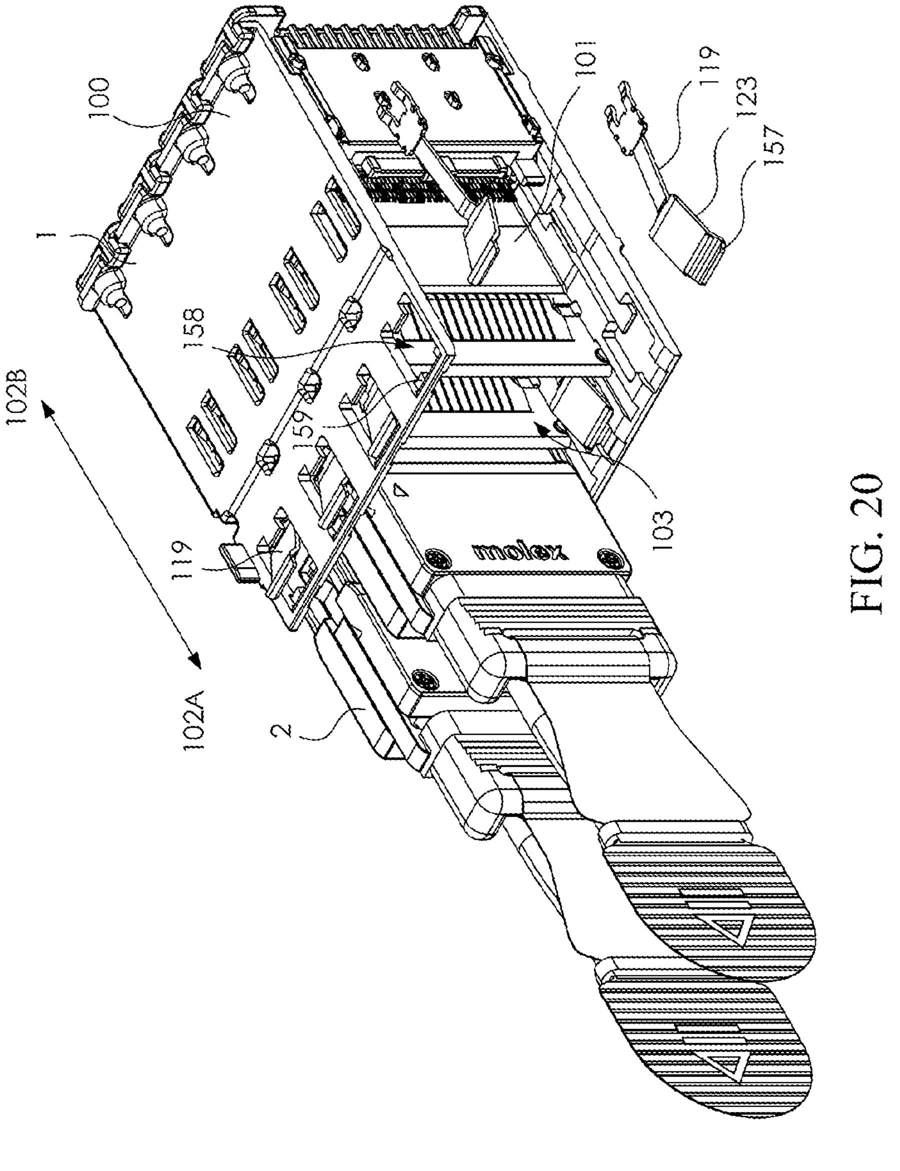
FIG. 20 is a perspective view of an embodiment of a receptacle module and a pluggable module.

As shown in FIG. 20, in some embodiments, the locking elastic sheet 119 (for example, two locking elastic sheets 119 close to a right side in FIG. 20, indicating a state of the locking elastic sheet 119 located in the cage 100) further includes a limiting edge 157. The limiting edge 157 is connected to the guiding section 123 of the locking elastic sheet 119 and is located at a tail end of the locking elastic sheet 119. Correspondingly, in this embodiment, the cage 100 further includes a plurality of openings 158 and limiting blocks 159. The opening 158 is disposed on a side wall of the insertion space 103 on which a locking member is disposed, and the limiting block 159 is disposed on a side of the opening 158 close to the insertion end 102A. In the embodiments, when the locking elastic sheet 119 is subjected to no force, for example, when no pluggable module 2 is inserted into the accommodation space 103, a limiting edge 157 of the locking elastic sheet 119 abuts against the limiting block 159 from outside to inside. However, when the pluggable module 2 is inserted into the accommodation space 103, the locking elastic sheet 119 is moved due to a force to move the limiting edge 157 out of the opening 158. When the pluggable module 2 is just inserted but not mated, or is in an unlocked state (for example, a leftmost pluggable module 2 in FIG. 20), a height by which the limiting edge 157 protrudes from the opening 158 is greater than a height of the pluggable module 2 in a state of being mated with the receptacle module 1 (for example, a second left pluggable module 2 in FIG. 20).

Figure 21:
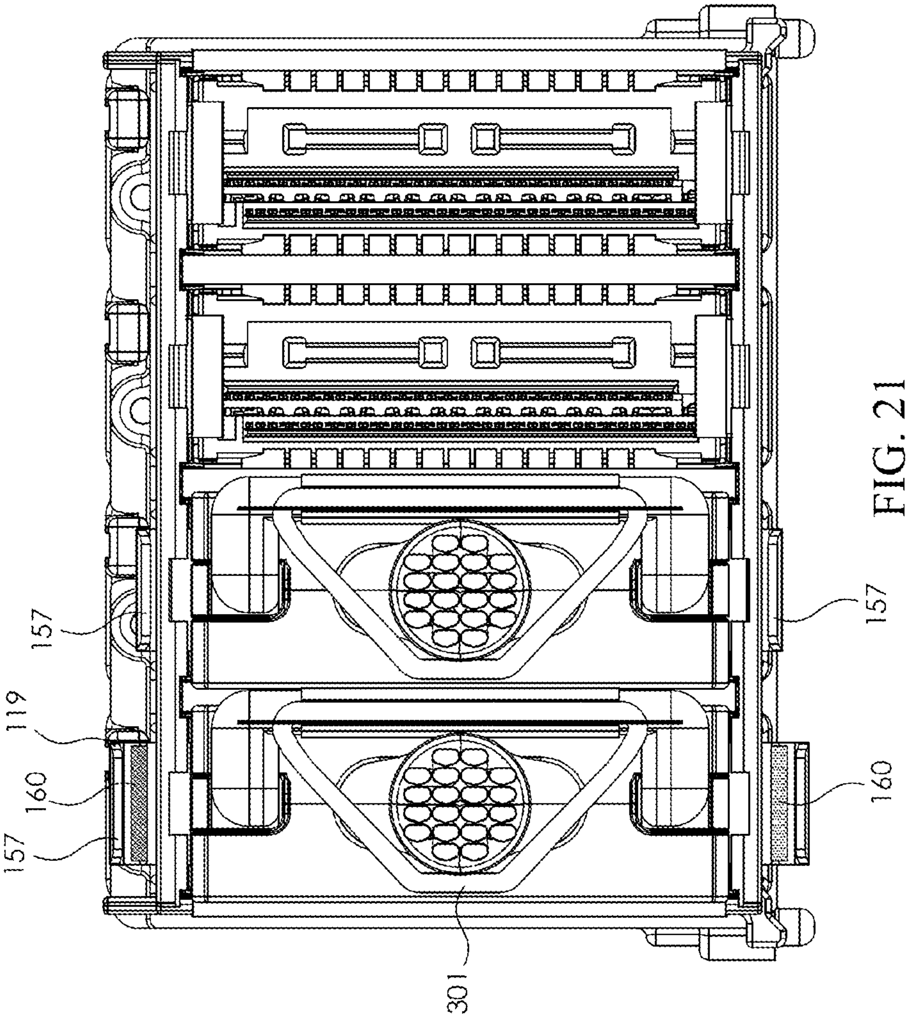
FIG. 21 is a schematic front view of an embodiment of a receptacle module and a pluggable module.

In the above embodiment, the height by which the limiting edge 157 protrudes from the opening 158 may assist a user in determining whether the pluggable module 2 is correctly mated with the receptacle module 1. Referring also to FIG. 21, an inner side surface of the locking elastic sheet 119 facing the insertion end 102A may include a visual marking region 160. When the pluggable module 2 is just inserted but not mated, or is in an unlocked state (for example, a leftmost pluggable module 2 in FIG. 21), the limiting edge 157 protrudes from the opening 158 and the visual marking region 160 is exposed. When the pluggable module 2 is mated with the receptacle module 1 (for example, the second left pluggable module 2 in FIG. 20), merely the limiting edge 157 protrudes from the opening 158, but the visual marking region 160 is not exposed, so that a user may determine whether the pluggable module 2 is correctly mated with the receptacle module 1 by observing whether the visual marking region 160 is visible.

The foregoing content summarizes the structures of several embodiments, so that a person familiar with the art can better understand the aspect of the present disclosure. A person familiar with the art should understand that they can easily use the present disclosure as a basis for designing or modifying other processes and structures to implement the same purpose and/or achieve the same advantages of the embodiments described herein. A person familiar with the art should also understand that these equivalent structures do not depart from the spirit and scope of the present disclosure, and they can make various changes, substitutions and modifications in this specification without departing from the spirit and scope of the present disclosure.

We claim:

1. A connector assembly, comprising:

a receptacle module, comprising:

a cage having at least one accommodation space formed by a plurality of wall plates, the accommodation space having a front end and a back end opposite to the front end, and the accommodation space comprising an insertion space at the front end and an assembling space at the back end; and a receptacle connector configured to be disposed in the assembling space movable from an initial position toward the back end, and comprising a first mating end facing the front end of the cage, the first mating end having a receptacle terminal portion and a receptacle alignment portion extending from a common face of the first mating end, wherein the receptacle terminal portion has a plurality of receptacle terminals, and the receptacle alignment portion comprises a first alignment protruded portion and a second alignment protruded portion; and a pluggable module configured to be inserted into the accommodation space and moved from the front end to the back end to be inserted into the receptacle module, the pluggable module comprising:

a housing; and a plug connector disposed in the housing and having a second mating end, the second mating end having a plug terminal portion and a plug alignment portion extending from a common face of the second mating end, wherein the plug terminal portion has a plurality of plug terminals, and the plug alignment portion comprises a third alignment recessed portion and a fourth alignment recessed portion;

wherein, in the alignment and connection relationship between the receptacle connector and the plug connector, the third alignment recessed portion is to be mated and aligned with the first alignment protruded portion, and the fourth alignment recessed portion is to be mated and aligned with the second alignment protruded portion, and wherein the mating between the first alignment protruded portion and third alignment recessed portion is configured to occur before the mating between the second alignment protruded portion and the fourth alignment recessed portion.

2. The connector assembly according to claim 1, wherein:

a length by which the first alignment protruded portion protrudes is greater than a length by which the second alignment protruded portion protrudes; and a depth of the third alignment recessed portion is greater than a depth of the fourth alignment recessed portion.

3. The connector assembly according to claim 2, wherein the receptacle alignment portion comprises a first alignment recessed portion disposed between two second alignment protruded portions, the plug alignment portion comprises a third alignment protruded portion disposed between two fourth alignment recessed portions, and the third alignment protruded portion and the first alignment recessed portion are aligned with and fit each other.

4. The connector assembly according to claim 3, wherein the second alignment protruded portion forms a plate body, and is aligned with and accommodated in an accommodation slot of the plug alignment portion of the plug connector.

5. The connector assembly according to claim 4, wherein:

when the first alignment protruded portion is aligned with the third aligning recessed portion, a fit tolerance between the two is relatively large; and when the first alignment recessed portion is aligned with the third alignment protruded portion, a fit tolerance between the two is relatively small.

6. The connector assembly according to claim 1, wherein:

the first alignment protruded portions are located on two sides of the second alignment protruded portions;

a side of the third alignment recessed portion further includes a side opening configured to accommodate the first alignment protruded portion;

the side opening is disposed in the housing of the pluggable module; and the front end of the housing of the pluggable module reaches a front end of the first alignment protruded portion and cannot be inserted further when mistakenly the pluggable module is mistakenly inserted into the receptacle module upside down.

7. The connector assembly according to claim 1, wherein:

the receptacle terminal portion and the receptacle alignment portion are respectively disposed in separate and independent regions of the first mating end;

the plug terminal portion and the plug alignment portion are respectively disposed in separate and independent regions of the second mating end;

the receptacle terminals comprise a plurality of first contact portions suspended on the receptacle terminal portion without being supported; and the plug terminals comprise a plurality of second contact portions suspended on the plug terminal portion without being supported, the second contact portions being configured to be in contact with the first contact portions when the pluggable module is mated with the receptacle module.

8. The connector assembly according to claim 1, further comprising:

a biasing spring disposed between the receptacle connector and the back end and configured to apply a spring load to the receptacle connector toward the front end; and a locking member assembled on a side wall of the cage in the insertion space extending from the side wall into the insertion space, wherein the housing of the pluggable module is locked by the locking member when the pluggable module is inserted into the receptacle module.

9. A connector assembly, comprising:

a receptacle module, comprising:

a cage having at least one accommodation space formed by a plurality of wall plates, the accommodation space having a front end and a back end opposite to the front end and comprising an insertion space close to the front end and an assembling space close to the back end;

a receptacle connector disposed in the assembling space, being movable from an initial position toward the back end, and comprising a first mating end facing the front end of the cage, the first mating end having a receptacle terminal portion and a receptacle alignment portion both extending from the first mating end, the receptacle terminal portion having a plurality of receptacle terminals;

a biasing spring configured to apply a spring load to the receptacle connector toward the front end; and a locking member assembled to a side wall of the cage; and a pluggable module comprising:

a second mating end, the second mating end having a plug terminal portion and a plug alignment portion both extending from the first mating end, the plug terminal portion having a plurality of plug terminals, wherein:

the pluggable module is configured to move from the front end to the back end to insert into the insertion space of the accommodation space, the plug alignment portion aligns with and is complementary to the receptacle alignment portion, and the receptacle terminals of the receptacle terminal portion are in contact with the plug terminals of the plug terminal portion;

the pluggable module is configured to be locked by the locking member when the receptacle connector is moved from the initial position toward the back end to a mating position; and a limiting slot is provided on the wall plate, a side surface of the receptacle connector facing the limiting slot having a corresponding alignment protruding bar for fitting, wherein the alignment protruding bar is configured to move forward and backward along the limiting slot, and one end of the alignment protruding bar abuts against a front inner end of the limiting slot when the receptacle connector is at the initial position.

10. The connector assembly according to claim 9, wherein the locking member of the receptacle module comprises a locking elastic sheet, the locking elastic sheet comprising:

a fixing portion assembled on the side wall;

an elastic arm connected to the fixing portion and extending into the insertion space and toward the front end;

a locking portion connected to the elastic arm and further extending into the insertion space; and a guiding section connected to the locking portion and extending toward the side wall and the front end to form, with the locking portion, a protruded portion folded into the insertion space, wherein the locking portion comprises a locking recessed portion, and the locking portion of the locking elastic sheet is configured to abut against an inner edge of the locking recessed portion facing the back end when the pluggable module is inserted into the receptacle module.

11. The connector assembly according to claim 10, wherein:

the locking elastic sheet further comprises a limiting edge connected to the guiding section located at a tail end of the locking elastic sheet;

the cage further comprises an opening disposed on the side wall of the insertion space and a limiting block disposed on a side of the opening facing the front end;

the limiting edge is configured to abut against the limiting block when the locking elastic sheet is subjected to no force; and the limiting edge is configured to move out of the opening when the locking elastic sheet is subjected to a force.

12. The connector assembly according to claim 10, wherein:

the pluggable module further comprises an unlocking member subjected to a spring load, the unlocking member comprising two side arms disposed on two sides of the pluggable module, and an inclined unlocking surface being disposed on one end of each of the side arms respectively, and the inclined unlocking surface is configured to push away the locking elastic sheet when the unlocking member is moved toward the front end, so that the locking portion exits the locking recessed portion.

13. The connector assembly according to claim 9, wherein:

the receptacle module further comprises at least one back plate disposed at the back end of the cage, the biasing spring being disposed between the receptacle connector and the back plate;

the receptacle connector further comprising a receptacle housing, the receptacle terminals being disposed at a front end of the receptacle housing, and the receptacle terminals being electrically connected to a plurality of first wires, the first wires extending from a side surface of the receptacle housing toward the back end and passing through an outlet opening of the back plate; and the pluggable module comprises a plug connector, the plug connector comprising a plug housing configured to accommodate the plug terminals and electrically connect the plug terminals to a plurality of second wires.

14. The connector assembly according to claim 13, wherein:

the receptacle alignment portion comprises a first alignment protruded portion and a second alignment protruded portion;

the plug alignment portion comprises a third alignment recessed portion and a fourth alignment recessed portion;

in the alignment and connection relationship between the receptacle connector and the plug connector, the third alignment recessed portion is configured to mate and align with the first alignment protruded portion, and the fourth alignment recessed portion is configured to mate and align with the second alignment protruded portion; and the mating between the first alignment protruded portion and third alignment recessed portion is configured to occur before the mating between the second alignment protruded portion and the fourth alignment recessed portion.

15. The connector assembly according to claim 14, wherein:

the first alignment protruded portions are located on two sides of the second alignment protruded portions;

a side of the third alignment recessed portion further comprises a side opening configured to accommodate the first alignment protruded portion;

the side opening is disposed in the housing of the pluggable module; and the front end of the housing of the pluggable module is configured to reach a front end of the first alignment protruded portion and cannot be inserted further when the pluggable module is mistakenly inserted into the receptacle module upside down.

16. The connector assembly according to claim 14, wherein:

a length by which the first alignment protruded portion protrudes is greater than a length by which the second alignment protruded portion protrudes; and a depth of the third alignment recessed portion is greater than a depth of the fourth alignment recessed portion.

17. The connector assembly according to claim 16, wherein the receptacle alignment portion comprises a first alignment recessed portion disposed between two second alignment protruded portions, the plug alignment portion comprises a third alignment protruded portion disposed between two fourth alignment recessed portions, the third alignment protruded portion and the first alignment recessed portion being aligned with and fitting each other.

18. The connector assembly according to claim 17, wherein the second alignment protruded portion forms a plate body, and is aligned with and accommodated in an accommodation slot of the plug alignment portion of the plug connector.

19. A receptacle module, comprising:

a cage having at least one accommodation space formed by a plurality of wall plates, the accommodation space having a front end and a back end opposite to the front end and comprising an insertion space close to the front end and an assembling space close to the back end;

a receptacle connector disposed in the assembling space, being movable from an initial position toward the back end, and comprising a first mating end facing the front end of the cage, the first mating end having a receptacle terminal portion and a receptacle alignment portion both extending from the first mating end, the receptacle terminal portion having a plurality of receptacle terminals; and a biasing spring configured to apply a spring load to the receptacle connector toward the front end, wherein the receptacle terminal portion and the receptacle terminal portion are independent of one another, the receptacle terminal portion is adjacent to a lower side of the first mating end of the receptacle connector, and the receptacle alignment portion is adjacent to an upper side of the first mating end of the receptacle connector.

20. The receptacle module of claim 19, wherein the receptacle terminal portion and the receptacle alignment portion occupy respective halves of an area of the first mating end.

* * * * *